US012795117B2

(12) United States Patent
Yang et al.

(10) Patent No.: US 12,795,117 B2
(45) Date of Patent: Nov. 10, 2026

(54) POINT CLOUD ENCODING METHOD, POINT CLOUD DECODING METHOD, DECODER, AND NON-TRANSITORY COMPUTER STORAGE MEDIUM

(71) Applicant: GUANGDONG OPPO MOBILE TELECOMMUNICATIONS CORP., LTD., Dongguan (CN)

(72) Inventors: Fuzheng Yang, Dongguan (CN); Junyan Huo, Dongguan (CN); Yanzhuo Ma, Dongguan (CN); Ming Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/003,776

(22) Filed: Dec. 27, 2024

(65) Prior Publication Data

US 2026/0122252 A1 Apr. 30, 2026

Related U.S. Application Data

(63) Continuation of application No. PCT/CN2022/104466, filed on Jul. 7, 2022.

(51) Int. Cl.
*H04N 19/167* (2014.01)
*H04N 19/96* (2014.01)

(52) U.S. Cl.
CPC ........... *H04N 19/167* (2014.11); *H04N 19/96* (2014.11)

(58) Field of Classification Search
CPC ............................ H04N 19/167; H04N 19/96
(Continued)

(56) References Cited

U.S. PATENT DOCUMENTS 12,518,429 B2 * 1/2026 Unno ...................... G06T 9/001
2020/0413080 A1 * 12/2020 Lasserre ................ H04N 19/96
(Continued)

FOREIGN PATENT DOCUMENTS

CN 111612059 A 9/2020
CN 114008997 A 2/2022

OTHER PUBLICATIONS

"G-PCC 2nd Edition codec description", ISO/IEC JTC 1/SC 29/WG 7N00314, WG 7, MPEG 3D Graphics Coding, Apr. 2022.
(Continued)

*Primary Examiner* — Justin W Rider
(74) *Attorney, Agent, or Firm* — Sheppard, Mullin, Richter & Hampton LLP

(57) ABSTRACT

A point cloud decoding method includes that: a decoder decodes a bitstream, and determines all planar flag information of a current node; in a case where the all planar flag information indicates that occupied child-nodes of the current node constitute planes in all of three preset spatial directions, the decoder decodes the bitstream to determine three pieces of plane position information of the current node in the three preset spatial directions and determines reconstructed geometry information of the current node; in a case where the all planar flag information indicates that occupied child-nodes of the current node do not all constitute planes in three preset spatial directions, the decoder decodes the bitstream to determine first planar flag information of the current node in a first spatial direction and second planar flag information of the current node in a second spatial direction, and determines reconstructed geometry information of the current node.

20 Claims, 9 Drawing Sheets

(58) Field of Classification Search
USPC .................................................... 375/240.08
See application file for complete search history.

(56) References Cited

U.S. PATENT DOCUMENTS

| | | | | |
|---|---|---|---|---|
| 2021/0192271 | A1 | 6/2021 | Huang et al. | |
| 2021/0407143 | A1 | 12/2021 | Van der Auwera et al. | |
| 2022/0108492 | A1* | 4/2022 | Van der Auwera | G06T 9/40 |
| 2022/0351423 | A1* | 11/2022 | Martin-Cocher | G06T 9/40 |
| 2022/0398784 | A1* | 12/2022 | Taquet | G06T 9/001 |
| 2023/0048381 | A1* | 2/2023 | Taquet | G06T 9/005 |
| 2023/0224506 | A1* | 7/2023 | Zhang | H04N 19/96 375/240.02 |
| 2024/0404118 | A1* | 12/2024 | Zhang | G06T 9/005 |

OTHER PUBLICATIONS

International Search Report and Written Opinion of the International Searching Authority regarding International Patent Application No. PCT/CN2022/104466, dated Mar. 17, 2023.

* cited by examiner

POINT CLOUD ENCODING METHOD, POINT CLOUD DECODING METHOD, DECODER, AND NON-TRANSITORY COMPUTER STORAGE MEDIUM

CROSS-REFERENCE TO RELATED APPLICATION

This application is a Continuation application of International Application No. PCT/CN2022/104466 filed on Jul. 7, 2022, which is incorporated herein by reference in its entirety.

TECHNICAL FIELD

Embodiments of the present disclosure relate to the field of video coding technology, and in particular to, a point cloud encoding method, a point cloud decoding method, a decoder, an encoder, and a non-transitory computer storage medium.

BACKGROUND

In a geometry-based point cloud compression (Geometry-based Point Cloud Compression, G-PCC) framework, geometry information of a point cloud and attribute information corresponding to each point cloud are encoded separately. After geometry encoding is completed, the geometry information is reconstructed, and encoding of the attribute information will depend on reconstructed geometry information.

In a point cloud G-PCC encoder framework, there are two encoding methods for the geometry information, i.e., multiway-tree based geometry encoding and prediction-tree based geometry encoding.

A planar encoding mode is introduced in a process for multiway-tree partition. However, an actual situation of a node in the point cloud is not combined in a common planar encoding mode for multiway-tree geometry encoding when a planar flag bit is encoded, thereby resulting in problems of high complexity and low encoding efficiency and further, reducing video compression performance.

SUMMARY

The embodiments of the present disclosure provide a point cloud encoding method, a point cloud decoding method, a decoder, an encoder, and a non-transitory computer storage medium.

The technical solution of the embodiments of the present disclosure can be implemented as follows.

In a first aspect, the embodiments of the present disclosure provide a point cloud decoding method, applied to a decoder, where the method includes:

decoding a bitstream to determine all planar flag information of a current node;

in a case where the all planar flag information indicates that occupied child-nodes of the current node constitute planes in all of three preset spatial directions, decoding the bitstream to determine three pieces of plane position information of the current node in the three preset spatial directions, and determining reconstructed geometry information of the current node based on the three pieces of plane position information; and in a case where the all planar flag information indicates that occupied child-nodes of the current node do not all constitute planes in three preset spatial directions, decoding the bitstream to determine first planar flag information of the current node in a first spatial direction and second planar flag information of the current node in a second spatial direction, and determining reconstructed geometry information of the current node according to the first planar flag information and the second planar flag information; where the first spatial direction and the second spatial direction are any two different directions in the three preset spatial directions.

In a second aspect, the embodiments of the present disclosure provide a point cloud encoding method, applied to an encoder, where the method includes:

determining three pieces of planar flag information of a current node in three preset spatial directions;

in a case where the three pieces of planar flag information indicate that occupied child-nodes of the current node constitute planes in all of three preset spatial directions, setting all planar flag information of the current node to indicate that the occupied child-nodes of the current node constitute planes in all of the three preset spatial directions, and writing the all planar flag information into a bitstream; and in a case where the three pieces of planar flag information indicate that occupied child-nodes of the current node do not all constitute planes in three preset spatial directions, set all planar flag information of the current node to indicate that the occupied child-nodes of the current node do not all constitute planes in the three preset spatial directions, and writing the all planar flag information into a bitstream.

In a third aspect, the embodiments of the present disclosure provide a decoder, where the decoder includes: a decoding portion and a first determining portion, the decoding portion is configured to decode a bitstream;

the first determining portion is configured to determine all planar flag information of the current node;

the decoding portion is further configured to decode the bitstream in a case where the all planar flag information indicates that occupied child-nodes of the current node constitute planes in all of three preset spatial directions;

the first determining portion is further configured to determine three pieces of plane position information of the current node in the three preset spatial directions, and determine reconstructed geometry information of the current node based on the three pieces of plane position information;

the decoding portion is further configured to decode the bitstream in a case where the all planar flag information indicates that the occupied child-nodes of the current node do not all constitute planes in the three preset spatial directions;

the first determining portion is further configured to determine first planar flag information of the current node in a first spatial direction and second planar flag information of the current node in a second spatial direction, and determine reconstructed geometry information of the current node according to the first planar flag information and the second planar flag information; where the first spatial direction and the second spatial direction are any two different directions in the three preset spatial directions.

In a fourth aspect, the embodiments of the present disclosure provide a decoder, where the decoder includes a first processor and a first memory storing instructions executable by the first processor, where when the instructions are executed, the point cloud decoding method mentioned above is implemented.

In a fifth aspect, the embodiments of the present disclosure provide an encoder, where the encoder includes: a second determining portion and an encoding portion, the second determining portion is configured to determine three pieces of planar flag information of a current node in three preset spatial directions; set all planar flag information of the current node to indicate that the occupied child-nodes of the current node constitute planes in all of the three preset spatial directions in a case where the three pieces of planar flag information indicate that occupied child-nodes of the current node constitute planes in all of three preset spatial directions;

the second determining portion is further configured to set all planar flag information of the current node to indicate that occupied child-nodes of the current node do not all constitute planes in three preset spatial directions in a case where the three pieces of planar flag information indicate that the occupied child-nodes of the current node do not all constitute planes in the three preset spatial directions;

the encoding portion is configured to write the all planar flag information into a bitstream.

In a sixth aspect, the embodiments of the present disclosure provide an encoder, where the encoder includes: a second processor and a second memory storing instructions executable by the second processor, where when the instructions are executed by the second processor, the point cloud encoding method mentioned above is implemented.

In a seventh aspect, the embodiments of the present disclosure provide a non-transitory computer storage medium, where the non-transitory computer storage medium stores a computer program, where when the computer program is executed by a processor, the point cloud decoding method and the point cloud encoding method mentioned above are implemented.

DETAILED DESCRIPTION

Figure 1:
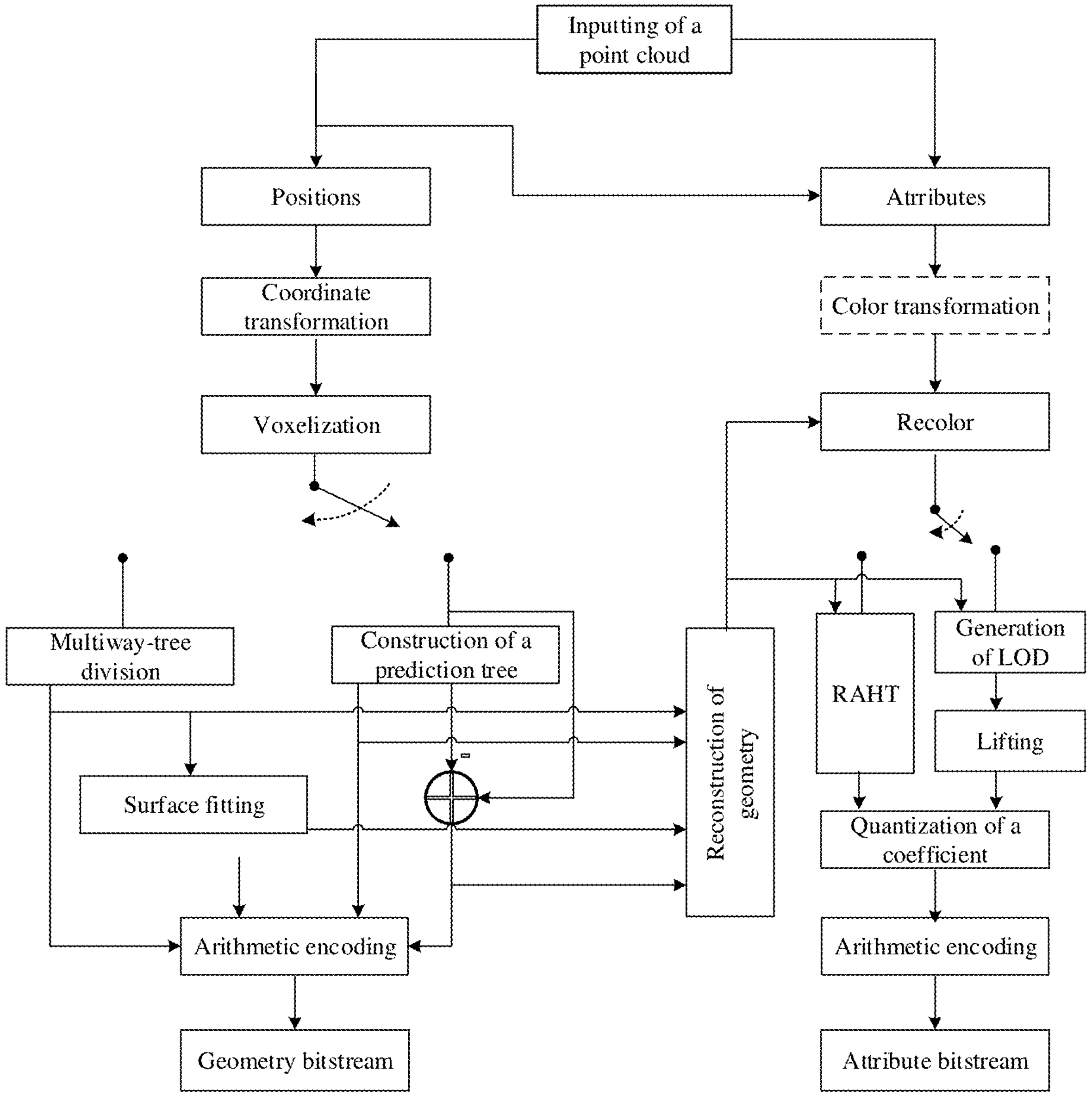
FIG. 1 is a schematic diagram of a framework of a G-PCC encoder.

In order to enable a more detailed understanding of the features and technical contents of the embodiments of the present disclosure, the implementation of the embodiments of the present disclosure is described in detail below in combination with the accompanying drawings. The accompanying drawings attached are for reference and description only and are not used to limit the embodiments of the present disclosure.

Unless defined otherwise, all technical and scientific terms used herein have the same meaning as commonly understood by one of ordinary skill in the art to which the present disclosure belongs. The terms used herein are only for the purpose of describing the embodiments of the present disclosure and are not intended to limit the present disclosure.

In the following description, "some embodiments" involved describe a subset of all possible embodiments, but it can be understood that "some embodiments" may be the same subset or different subsets of all possible embodiments and may be combined with each other without conflict.

It should be noted that the terms "first\second\third" involved in the embodiments of the present disclosure are merely to distinguish similar objects and do not represent a specific ordering of the objects. It can be understood that "first\second\third" can be interchanged in a specific order or sequence in a case of permission, so that the embodiments of the present disclosure described herein can be implemented in an order other than that illustrated or described herein.

Herein, a point cloud is a three-dimensional representation of a surface of an object. A point cloud (data) of a surface of an object may be collected and obtained by an acquisition device such as a photoelectric radar, a lidar, a laser scanner, and a multi-view camera, etc.

A point cloud (Point Cloud) refers to a set of massive three-dimensional points. A point in the point cloud may include position information of the point and attribute information of the point. For example, position information of a point may be three-dimensional coordinate information of the point. The position information of the point may also be referred to as geometry information of the point. For example, attribute information of a point may include color information and/or reflectivity, etc. For example, the color information may be information in any color space. For example, the color information may be RGB information, where R represents red (R), G represents green (G), and B represents blue (B). For another example, the color information may be luma and chroma (YcbCr, YUV) information, where Y represents Luma (Luma), Cb (U) represents blue color difference, and Cr (V) represents red color difference.

A point in a point cloud obtained according to the laser measurement principle may include three-dimensional coordinate information of the point and laser reflection intensity (reflectance) of the point. For another example, a point in a point cloud obtained according to the photogrammetry principle may include three-dimensional coordinate information of the point and color information of the point. For another example, a point in a point cloud obtained by combining the laser measurement principle and the photogrammetry principle may include three-dimensional coordinate information of the point, laser reflection intensity (reflectance) of the point, and color information of the point.

Point cloud may be classified into the following categories according to the acquisition way:

first category of static point cloud: an object is stationary, and a device for acquiring a point cloud is also stationary;

second category of dynamic point cloud: an object is moving, but a device for acquiring a point cloud is stationary; and third category of dynamically acquired point cloud: a device for acquiring a point cloud is moving.

For example, point cloud may be classified into two categories according to usage of a point cloud:

first category: machine-sensing point cloud, which may be used in a scenario, such as an autonomous navigation system, a real-time inspection system, a geographic information system, a visual sorting robot, a disaster relief robot, etc., and second category: human eye-sensing point cloud, which may be used in a point cloud application scenario, such as digital cultural heritage, free viewpoint broadcasting, three-dimensional immersive communication, and three-dimensional immersive interaction, etc.

Since a point cloud is a set of massive points, storing the point cloud not only consumes a lot of memory, but is also not conducive to transmission and there is also not an enough bandwidth to support direct transmission of the point cloud on a network layer without compression, the point cloud need to be compressed.

Up to now, a point cloud encoding framework that may compress a point cloud may be a geometry-based point cloud compression (Geometry Point Cloud Compression, G-PCC) coding framework or a video-based point cloud compression (Video Point Cloud Compression, V-PCC) coding framework provided by the moving picture experts group (Moving Picture Experts Group, MPEG), or an AVS-PCC coding framework provided by the audio video standard (Audio Video Standard, AVS). The G-PCC coding framework may be used to compress the first category of static point cloud and the third category of dynamically acquired point cloud, and the V-PCC coding framework may be used to compress the second category of dynamic point cloud. The G-PCC coding framework is also referred to as a point cloud codec TMC13, and the V-PCC coding framework is also referred to as a point cloud codec TMC2.

It can be understood that in a point cloud G-PCC encoder framework, an input point cloud is divided into slices and then the slices are independently encoded. In a slice, geometry information of the point cloud and attribute information corresponding to a point in the point cloud are encoded separately. The geometry information is first encoded by a G-PCC encoder. Coordinate transformation is performed on the geometry information by the encoder, so that the entire point cloud is contained in a bounding box, and then, quantization is performed on the geometry information after the coordinate transformation. This step of quantization mainly plays a role of scaling. Due to quantization and rounding, the geometry information of some points is the same. Whether to remove a duplicate point is determined based on a parameter. Not removing a duplicate point is referred to as geometry lossless compression, and removing a duplicate point is referred to as geometry lossy compression. The process of quantization and removing a duplicate point is also referred to as voxelization. Then, the bounding box is divided based on a multiway-tree (e.g., an octree, a quadtree, or a binary tree). According to different depths of partition levels of a multiway-tree, encoding of the geometry information is partitioned into two frameworks: a multiway-tree based framework and a prediction-tree based framework.

In a multiway-tree based geometry information encoding framework, the bounding box is partitioned equally into multiple child-cubes, and an occupancy bit of a child-cube is recorded (where 1 is non-empty and 0 is empty). A non-empty child-cube continues to be partitioned equally, and the partition is usually stopped when a leaf node obtained by the division is a 1×1×1 unit cube. In this process, intra-frame prediction is performed on the occupancy bit by using spatial correlation between a node and its surrounding nodes, and finally arithmetic encoding (CABAC (Context-based Adaptive Binary Arithmetic Coding)) is performed on the occupancy bit after intra-frame prediction to generate a binary geometry bit stream, i.e., a geometry bitstream.

After completing the geometry information encoding, the G-PCC encoder reconstructs the geometry information and uses reconstructed geometry information to encode the attribute information of the point cloud. In the multiway-tree based geometry information encoding framework, there is a geometry reconstruction process in both the geometry lossless compression and the geometry lossy compression when the multiway-tree partition is completed. Currently, attribute encoding of a point cloud is mainly to encode color information of the point in the point cloud. First, color spatial transformation may be performed on the color information of the point by the encoder. For example, when the color information of the point in the input point cloud is represented by using the RGB color space, the encoder may transform the color information from the RGB color space to the YUV color space. Then, the point cloud is recolored by using the reconstructed geometry information, so that unencoded attribute information corresponds to the reconstructed geometry information. In color information encoding, there are two main transformation methods: one method is distance-based lifting transformation that relies on LOD partition, and the other method is direct RAHT transformation. Both the two methods transform the color information from the space domain to the frequency domain to obtain a high-frequency coefficient and a low-frequency coefficient. Finally, the coefficients are quantized and arithmetically encoded to generate a binary attribute bitstream, i.e., an attribute bitstream.

In a point cloud G-PCC decoder framework, the geometry bitstream of the point cloud and the attribute bitstream corresponding to the point in the point cloud are decoded separately. The G-PCC decoder decodes the geometry bitstream. The decoder performs arithmetical decoding on the geometry bitstream to decode the bounding box of the point cloud and the multiway-tree based occupancy bit (1 is non-empty, and 0 is empty). According to different depths of partition levels of the multiway-tree during encoding, decoding of the geometry information is partitioned into two frameworks: a multiway-tree based framework and a prediction-tree based framework.

FIG. 1 is a schematic diagram of a framework of a G-PCC encoder. In the schematic diagram of the framework of the G-PCC encoder as shown in FIG. 1, applied to a point cloud encoder, for point cloud data to be encoded, the point cloud data is first partitioned into a plurality of slices through slice partition. In each slice, the geometry information of the point cloud and the attribute information corresponding to each point cloud are encoded separately. In a process of geometry encoding, coordinate transformation is performed on the geometry information, so that the entire point cloud is contained in a bounding box, and then quantization is performed on the geometry information after the coordinate transformation. This step of quantization mainly plays a role of scaling. Due to quantization and rounding, the geometry information of some point clouds is the same. Whether to remove a duplicate point is determined based on a parameter. The process of quantization and removing a duplicate point is also referred to as voxelization. Then, the bounding box is partitioned into a multiway-tree. In the process of multiway-tree based geometry information encoding, the bounding box is partitioned equally into a plurality of child-cubes, and a non-empty child-cube (including a point in the point cloud) is partitioned equally until a leaf node obtained through partition is a 1×1×1 unit cube. The point in a leaf node is arithmetically encoded to generate a binary geometry bit stream, i.e., a geometry bitstream.

In the process of attribute encoding, after the geometry encoding is completed and the geometry information is reconstructed, color transformation is performed on the reconstructed geometry information to transform the color information (i.e., attribute information) from the RGB color space to the YUV color space. The point cloud is then recolored by using the reconstructed geometry information, so that the unencoded attribute information corresponds to the reconstructed geometry information. Attribute encoding is mainly performed on color information. In the process of color information encoding, there are two main transformation methods: one is a distance-based lifting transformation that relies on a level of detail (Level of Detail, LOD) division, and the other is a direct region adaptive hierarchical transformation (Regionadaptive Hierarchal Transform, RAHT). Both the two methods transform the color information from the space domain to the frequency domain, a high-frequency coefficient and a low-frequency coefficient is obtained through transformation, and finally the coefficients are quantized (i.e., quantizing the coefficients). Finally, slice synthesis is performed on the geometry encoded data after multiway-tree partition and surface fitting and the attribute encoded data processed by the quantized coefficients, and a vertex coordinate of each block is encoded (i.e., arithmetic encoded) in turn to generate a binary attribute bit stream, i.e., an attribute bitstream.

Figure 2:
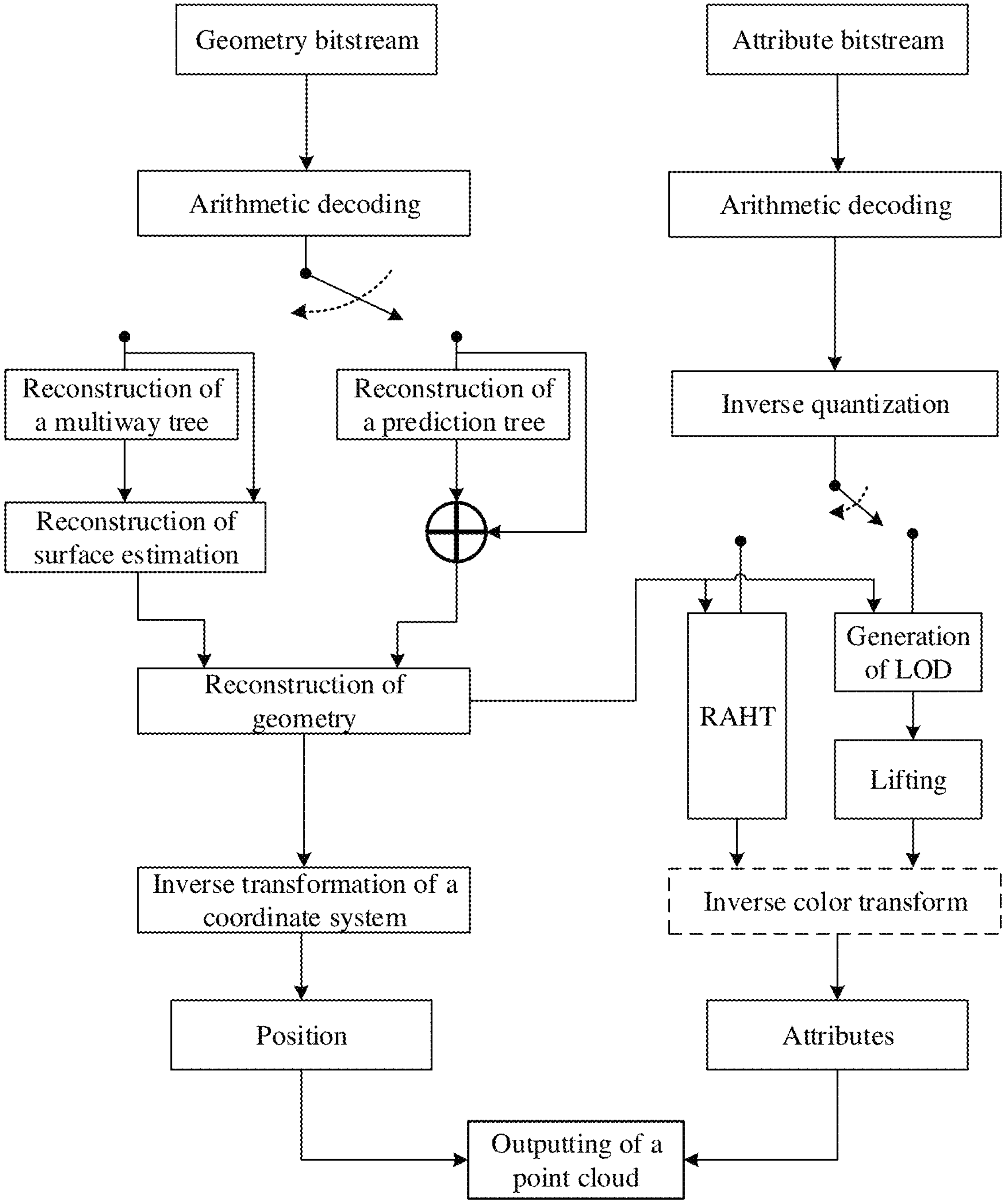
FIG. 2 is a schematic diagram of a framework of a G-PCC decoder.

FIG. 2 is a schematic diagram of a framework of a G-PCC decoder (as shown in FIG. 2, applied to a point cloud decoder). For an acquired binary bitstream, after the binary bitstream is acquired, the geometry bit stream and the attribute bit stream in the binary bitstream are decoded independently. When the geometry bit stream is decoded, the geometry information of the point cloud is obtained through arithmetic decoding-synthesizing multiway-tree-surface fitting-geometry reconstruction-inverse process of coordinate transformation. Herein, after the surface fitting, the step for performing the geometry reconstruction may be selected or the step for performing scalable-geometry reconstruction may also be selected, which is mainly determined according to whether to perform a spatial scalability function. In addition, when the attribute bit stream is decoded, the attribute information of the point cloud is obtained through arithmetic decoding-inverse quantization-LOD based inverse lifting or RAHT based inverse transformation-inverse process of color conversion. A three-dimensional image model of the point cloud data to be encoded is restored based on the geometry information and the attribute information.

The planar encoding mode is introduced in the multiway-tree partition process, and this process is located in the multiway-tree geometry encoding process and is applied to the multiway-tree partition and surface fitting portion as shown in FIG. 1. This method is used to efficiently encode a node that meets a plane qualification determination condition. In the planar encoding mode, first, a flag bit (i.e., occ_single_plane) is introduced, where the flag bit is used to represent whether occupied child-nodes in a current node belong to the same plane. In a case where occ_single_plane is 1, an additional flag bit (i.e., plane_position) is required, where the flag bit uses a binary symbol (e.g., 0 or 1) to represent whether the plane is located in a low plane or a high plane. For example, plane_position being 0 represents a low plane, and plane_position being 1 represents a high plane.

Figure 3:
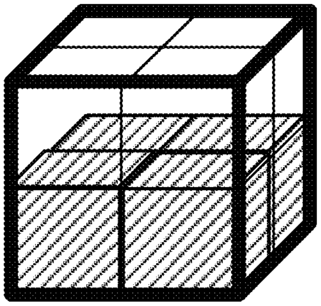
FIG. 3 is a first schematic diagram of a plane position of a multiway-tree node.
Figure 4:
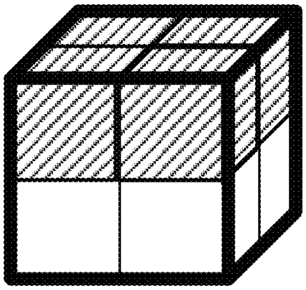
FIG. 4 is a second schematic diagram of a plane position of a multiway-tree node.
Figure 5:
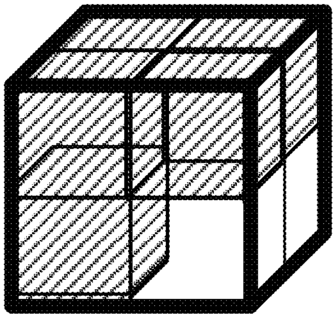
FIG. 5 is a third schematic diagram of a plane position of a multiway-tree node.

Exemplarily, FIG. 3 is a first schematic diagram of a plane position of a multiway-tree node, FIG. 4 is a second schematic diagram of a plane position of a multiway-tree node, and FIG. 5 is a third schematic diagram of a plane position of a multiway-tree node. As shown in FIG. 3, occupied child-nodes in a current node are all located in a low plane. As shown in FIG. 4, occupied child-nodes in a current node are all located in a high plane. As shown in FIG. 5, occupied child-nodes in a current node are all located in a non-plane.

When the planar encoding mode was first introduced, it is only for a plane in one direction (i.e., z direction). Later, considering different distributions of different point clouds, the planar encoding mode is expanded to planes in three directions (i.e., x direction, or y direction, or z direction). In some embodiments, first, a flag bit (i.e., occ_single_plane [axisIdx]) is introduced, where the flag bit is used to represent whether occupied child-nodes in a current node constitute a plane in a direction of an (axisIdx)-th axis. In a case where occ_single_plane[axisIdx] is 0, it represents that occupied child-nodes in a current node are located in other two plane directions perpendicular to the (axisIdx)-th axis.

In the planar encoding mode for a common multiway-tree geometry encoding process, it is first necessary to perform plane qualification determination on a node, and then to perform plane mode determination on the node that meets a plane qualification determination condition. In the planar mode determination process, a planar flag bit (i.e., occ_single_plane[axisIdx] (where 0≤axisIdx≤2)) is introduced to determine whether occupied child-nodes of the node are located in planes in three directions (i.e., x direction, y direction, and z direction). Assuming that occupied child-nodes of one node meet the plane qualification determination condition in each of three directions, determination criteria is as follows:

in a case where occ_single_plane[0] is 1, and both occ_single_plane[1] and occ_single_plane[2] are 0, it means that the occupied child-nodes of the node are located in an x-plane;

in a case where occ_single_plane[1] is 1, and both occ_single_plane[0] and occ_single_plane[2] are 0, it means that the occupied child-nodes of the node are located in a y plane;

in a case where occ_single_plane[2] is 1, and both occ_single_plane[0] and occ_single_plane[1] are 0, it means that the occupied child-nodes of the node are located in a z plane;

in a case where occ_single_plane[0] is 0, and both occ_single_plane[1] and occ_single_plane[2] are 1, it means that the occupied child-nodes of the node are located in a y-z plane;

in a case where occ_single_plane[1] is 0, and both occ_single_plane[0] and occ_single_plane[2] are 1, it means that the occupied child-nodes of the node are located in an x-z plane;

in a case where occ_single_plane[2] is 0, and both occ_single_plane[0] and occ_single_plane[1] are 1, it means that the occupied child-nodes of the node are located in an x-y plane;

in a case where all the occ_single_plane[0], occ_single_plane[1], and occ_single_plane[2] are 1, it means that the occupied child-nodes of the node are located in an x-y-z plane; and in a case where all the occ_single_plane[0], occ_single_plane[1], and occ_single_plane[2] are 0, it means that the occupied child-nodes of the node are not located in a plane.

After the determination is completed, the planar flag bit needs to be encoded. Further, when occ_single_plane[axisIdx] is 1, an additional binary symbol (e.g., 0 or 1) is required to encode the flag bit, plane_position [axisIdx]. The flag bit being 0 represents that the occupied child-nodes of the node are located in a low plane of the (axisIdx)-th axis. The flag bit being 1 represents that the occupied child-nodes of the node are located in a high plane of the (axisIdx)-th axis.

In the methods mentioned above, when the occupied child-nodes of the node meet the plane qualification determination condition in each of the three directions, three binary symbols (e.g., 0 or 1) are required to encode planar flag bits, i.e., occ_single_plane[0], occ_single_plane[1] and occ_single_plane[2]. However, in general, when the occupied child node of the node meets the plane qualification determination condition in each of the three directions, the node is most likely a plane in each of the three directions, that is, all the occ_single_plane[0], occ_single_plane[1] and occ_single_plane[2] are 1.

In other words, when the common planar encoding mode of multiway-tree geometry encoding is used to encode the planar flag bit, the actual situation of the node in the point cloud is not combined, thereby resulting in problems of high complexity and low encoding efficiency and reducing the video compression performance.

In order to solve the problems mentioned above, in the embodiments of the present disclosure, all planar flag information, all_planar_flag, is introduced. When a value of all_planar_flag is 1, it represents that occupied child-nodes of a current node constitute planes in all of three preset spatial directions, and at this time, there is no need to transmit, in a bitstream, three pieces of planar flag information of the current node in the three preset spatial directions. When a value of all_planar_flag is 0, it represents that occupied child-nodes of a current node do not constitute a plane in at least one spatial direction, and at this time, two pieces of planar flag information in two spatial directions of the three preset spatial directions may be determined first. In a case where the two pieces of planar flag information respectively indicate that the occupied child-nodes of the current node constitute planes in the two spatial directions, there is no need to transmit the remaining planar flag information in the bitstream. It can be seen that the point cloud coding method proposed in the embodiments of the present disclosure can reduce complexity, enhance decoding efficiency, and improve video compression performance.

The point cloud encoding method in the embodiments of the present disclosure may be applied to the multiway-tree partition and surface fitting portion as shown in FIG. 1. In addition, the point cloud decoding method in the embodiments of the present disclosure may further be applied to the reconstruction of multiway-tree and the estimation of the reconstructed surface as shown in FIG. 2. In other words, the point cloud coding method in the embodiments of the present disclosure may be applied to both the encoder and the decoder, and may even be applied to both the encoder and the decoder at the same time, but the embodiments of the present disclosure do not limit specifically thereto.

In a first clause, a point cloud decoding method is provided, which is applied to a decoder and includes:

decoding a bitstream, and determining all planar flag information of a current node;

in a case where the all planar flag information indicates that occupied child-nodes of the current node constitute planes in all of three preset spatial directions, decoding the bitstream to determine three pieces of plane position information of the current node in the three preset spatial directions, and determining reconstructed geometry information of the current node based on the three pieces of plane position information; and in a case where the all planar flag information indicates that occupied child-nodes of the current node do not all constitute planes in three preset spatial directions, decoding the bitstream to determine first planar flag information of the current node in a first spatial direction and second planar flag information of the current node in a second spatial direction, and determining reconstructed geometry information of the current node according to the first planar flag information and the second planar flag information; where the first spatial direction and the second spatial direction are any two different directions in the three preset spatial directions.

In a second clause, according to the first clause, the method further includes:

in a case where the all planar flag information indicates that the occupied child-nodes of the current node constitute planes in all of the three preset spatial directions, setting three pieces of planar flag information of the current node in the three preset spatial directions to indicate respectively that the occupied child-nodes of the current node constitute planes in the three preset spatial directions.

In a third clause, according to the first clause, the method further includes:

in a case where the first planar flag information indicates that the occupied child-nodes of the current node constitute a plane in the first spatial direction, and the second planar flag information indicates that the occupied child-nodes of the current node constitute a plane in the second spatial direction, decoding the bitstream to determine first plane position information of the current node in the first spatial direction and second plane position information of the current node in the second spatial direction; and determining the reconstructed geometry information of the current node based on the first plane position information and the second plane position information.

In a fourth clause, according to the third clause, the method further includes:

in a case where the first planar flag information indicates that the occupied child-nodes of the current node constitute a plane in the first spatial direction, and the second planar flag information indicates that the occupied child-nodes of the current node constitute a plane in the second spatial direction, setting third planar flag information of the current node in a third spatial direction to indicate that the occupied child-nodes of the current node do not constitute a plane in the third spatial direction; where the third spatial direction is a direction of the three preset spatial directions other than the first spatial direction and the second spatial direction.

In a fifth clause, according to the first clause, the method further includes:

in a case where the first planar flag information indicates that the occupied child-nodes of the current node do not constitute a plane in the first spatial direction, and/or the second planar flag information indicates that the occupied child-nodes of the current node do not constitute a plane in the second spatial direction, decoding the bitstream to determine third planar flag information of the current node in a third spatial direction; where the third spatial direction is a direction of the three preset spatial directions other than the first spatial direction and the second spatial direction; and determining the reconstructed geometry information of the current node according to the third planar flag information.

In a sixth clause, according to the fifth clause, the method further includes:

in a case where the first planar flag information indicates that the occupied child-nodes of the current node constitute a plane in the first spatial direction, the second planar flag information indicates that the occupied child-nodes of the current node do not constitute a plane in the second spatial direction, and the third planar flag information indicates that the occupied child-nodes of the current node do not constitute a plane in the third spatial direction, determining first plane position information of the current node in the first spatial direction; and determining the reconstructed geometry information of the current node based on the first plane position information; and in a case where the first planar flag information indicates that the occupied child-nodes of the current node constitute a plane in the first spatial direction, the second planar flag information indicates that the occupied child-nodes of the current node do not constitute a plane in the second spatial direction, and the third planar flag information indicates that the occupied child-nodes of the current node constitute a plane in the third spatial direction, determining first plane position information of the current node in the first spatial direction and third plane position information of the current node in the third spatial direction; and determining the reconstructed geometry information of the current node based on the first plane position information and the third plane position information.

In a seventh clause, according to the fifth clause, the method further includes:

in a case where the first planar flag information indicates that the occupied child-nodes of the current node do not constitute a plane in the first spatial direction, the second planar flag information indicates that the occupied child-nodes of the current node constitute a plane in the second spatial direction, and the third planar flag information indicates that the occupied child-nodes of the current node do not constitute a plane in the third spatial direction, determining second plane position information of the current node in the second spatial direction; and determining the reconstructed geometry information of the current node based on the second plane position information; and in a case where the first planar flag information indicates that the occupied child-nodes of the current node do not constitute a plane in the first spatial direction, the second planar flag information indicates that the occupied child-nodes of the current node constitute a plane in the second spatial direction, and the third planar flag information indicates that the occupied child-nodes of the current node constitute a plane in the third spatial direction, determining second plane position information of the current node in the second spatial direction and third plane position information of the current node in the third spatial direction; and determining the reconstructed geometry information of the current node based on the second plane position information and the third plane position information.

In an eighth clause, according to the fifth clause, the method further includes:

in a case where the first planar flag information indicates that the occupied child-nodes of the current node do not constitute a plane in the first spatial direction, the second planar flag information indicates that the occupied child-nodes of the current node do not constitute a plane in the second spatial direction, and the third planar flag information indicates that the occupied child-nodes of the current node constitute a plane in the third spatial direction, determining third plane position information of the current node in the third spatial direction; and determining the reconstructed geometry information of the current node based on the third plane position information.

In a ninth clause, according to the fourth clause or fifth clause, the method further includes:

in a case where the first planar flag information indicates that the occupied child-nodes of the current node constitute a plane in the first spatial direction, decoding the bitstream to determine first plane position information of the current node in the first spatial direction; and in a case where the first planar flag information indicates that the occupied child-nodes of the current node do not constitute a plane in the first spatial direction, skipping decoding of the first plane position information; and in a case where the second planar flag information indicates that the occupied child-nodes of the current node constitute a plane in the second spatial direction, decoding the bitstream to determine second plane position information of the current node in the second spatial direction; and in a case where the second planar flag information indicates that the occupied child-nodes of the current node do not constitute a plane in the second spatial direction, skipping decoding of the second plane position information; and in a case where the third planar flag information indicates that the occupied child-nodes of the current node constitute a plane in the third spatial direction, decoding the bitstream to determine third plane position information of the current node in the third spatial direction; and in a case where the third planar flag information indicates that the occupied child-nodes of the current node do not constitute a plane in the third spatial direction, skipping decoding of the third plane position information.

In a tenth clause, according to any one of the fifth to eighth clauses, the method further includes:

in a case where the first planar flag information indicates that the occupied child-nodes of the current node do not constitute a plane in the first spatial direction, determining that the first planar flag information indicates that a plane constituted by the occupied child-nodes of the current node is perpendicular to the first spatial direction; and/or in a case where the second planar flag information indicates that the occupied child-nodes of the current node do not constitute a plane in the second spatial direction, determining that the second planar flag information indicates that a plane constituted by the occupied child-nodes of the current node is perpendicular to the second spatial direction; and/or in a case where the third planar flag information indicates that the occupied child-nodes of the current node do not constitute a plane in the third spatial direction, determining that the third planar flag information indicates that a plane constituted by the occupied child-nodes of the current node is perpendicular to the third spatial direction.

In an eleventh clause, according to any one of the first to eighth clauses, the method further includes:

in a case where the current node meets a plane qualification determination condition in all of the three preset spatial directions, performing a process for determining the all planar flag information.

In a twelfth clause, according to the eleventh clause, the method further includes:

in a case where the current node does not meet the plane qualification determination condition in all of the three preset spatial directions, for one or two spatial directions that meet the plane qualification determination condition, decoding the bitstream to determine planar flag information of the current node in the one or two spatial directions; and determining the reconstructed geometry information of the current node according to the planar flag information of the current node in the one or two spatial directions.

In a thirteenth clause, according to any one of the first, third, sixth to eighth clauses, the method further includes:

in a case where a value of a plane position information is a first value, determining that the plane position information indicates that the occupied child-nodes of the current node constitute a high plane in a corresponding spatial direction; and in a case where a value of the plane position information is a second value, determining that the plane position information indicates that the occupied child-nodes of the current node constitute a low plane in a corresponding spatial direction.

In a fourteenth clause, a point cloud encoding method is provided, which is applied to an encoder and includes:

determining three pieces of planar flag information of a current node in three preset spatial directions;

in a case where the three pieces of planar flag information indicate that occupied child-nodes of the current node constitute planes in all of the three preset spatial directions, setting all planar flag information of the current node to indicate that the occupied child-nodes of the current node constitute planes in all of the three preset spatial directions, and writing the all planar flag information into a bitstream; and in a case where the three pieces of planar flag information indicate that occupied child-nodes of the current node do not all constitute planes in the three preset spatial directions, setting all planar flag information of the current node to indicate that the occupied child-nodes of the current node do not all constitute planes in the three preset spatial directions, and writing the all planar flag information into a bitstream.

In a fifteenth clause, according to the fourteenth clause, the method further includes:

in a case where the all planar flag information indicates that the occupied child-nodes of the current node constitute planes in all of the three preset spatial directions, determining three pieces of plane position information of the current node in the three preset spatial directions, and writing the three pieces of plane position information into the bitstream; and in a case where the all planar flag information indicates that the occupied child-nodes of the current node do not all constitute planes in the three preset spatial directions, performing encoding processing according to first planar flag information of the current node in a first spatial direction and second planar flag information of the current node in a second spatial direction; where the first spatial direction and the second spatial direction are any two different directions in the three preset spatial directions.

In a sixteenth clause, according to the fifteenth clause, the method further includes:

in a case where the all planar flag information indicates that the occupied child-nodes of the current node constitute planes in all of the three preset spatial directions, not writing the three pieces of planar flag information of the current node in the three preset spatial directions into the bitstream.

In a seventeenth clause, according to the fifteenth clause, the method further includes:

in a case where the first planar flag information indicates that the occupied child-nodes of the current node constitute a plane in the first spatial direction, and the second planar flag information indicates that the occupied child-nodes of the current node constitute a plane in the second spatial direction, determining first plane position information of the current node in the first spatial direction and second plane position information of the current node in the second spatial direction; and writing the first plane position information into the bitstream after the first planar flag information is written into the bitstream; and writing the second plane position information into the bitstream after the second planar flag information is written into the bitstream.

In an eighteenth clause, according to the seventeenth clause, the method further includes:

in a case where the first planar flag information indicates that the occupied child-nodes of the current node constitute a plane in the first spatial direction, and the second planar flag information indicates that the occupied child-nodes of the current node constitute a plane in the second spatial direction, not writing third planar flag information of the current node in a third spatial direction into the bitstream; where the third spatial direction is a direction of the three preset spatial directions other than the first spatial direction and the second spatial direction.

In a nineteenth clause, according to the fifteenth clause, the method further includes:

in a case where the first planar flag information indicates that the occupied child-nodes of the current node do not constitute a plane in the first spatial direction, and/or the second planar flag information indicates that the occupied child-nodes of the current node do not constitute a plane in the second spatial direction, determining third planar flag information of the current node in a third spatial direction; where the third spatial direction is a direction of the three preset spatial directions other than the first spatial direction and the second spatial direction; and performing encoding processing according to the third planar flag information.

In a twentieth clause, according to the nineteenth clause, the method further includes:

in a case where the first planar flag information indicates that the occupied child-nodes of the current node constitute a plane in the first spatial direction, the second planar flag information indicates that the occupied child-nodes of the current node do not constitute a plane in the second spatial direction, and the third planar flag information indicates that the occupied child-nodes of the current node do not constitute a plane in the third spatial direction, determining first plane position information of the current node in the first spatial direction; and writing the first plane position information into the bitstream after the first planar flag information is written into the bitstream; and in a case where the first planar flag information indicates that the occupied child-nodes of the current node constitute a plane in the first spatial direction, the second planar flag information indicates that the occupied child-nodes of the current node do not constitute a plane in the second spatial direction, and the third planar flag information indicates that the occupied child-nodes of the current node constitute a plane in the third spatial direction, determining first plane position information of the current node in the first spatial direction and third plane position information of the current node in the third spatial direction; and writing the first plane position information into the bitstream after the first planar flag information is written into the bitstream, and writing the third plane position information into the bitstream after the third planar flag information is written into the bitstream.

In a twenty-first clause, according to the nineteenth clause, the method further includes:

in a case where the first planar flag information indicates that the occupied child-nodes of the current node do not constitute a plane in the first spatial direction, the second planar flag information indicates that the occupied child-nodes of the current node constitute a plane in the second spatial direction, and the third planar flag information indicates that the occupied child-nodes of the current node do not constitute a plane in the third spatial direction, determining second plane position information of the current node in the second spatial direction; and writing the second plane position information into the bitstream after the second planar flag information is written into the bitstream; and in a case where the first planar flag information indicates that the occupied child-nodes of the current node do not constitute a plane in the first spatial direction, the second planar flag information indicates that the occupied child-nodes of the current node constitute a plane in the second spatial direction, and the third planar flag information indicates that the occupied child-nodes of the current node constitute a plane in the third spatial direction, determining second plane position information of the current node in the second spatial direction and third plane position information of the current node in the third spatial direction; and writing the second plane position information into the bitstream after the second planar flag information is written into the bitstream, and writing the third plane position information into the bitstream after the third planar flag information is written into the bitstream.

In a twenty-second clause, according to the nineteenth clause, the method further includes:

in a case where the first planar flag information indicates that the occupied child-nodes of the current node do not constitute a plane in the first spatial direction, the second planar flag information indicates that the occupied child-nodes of the current node do not constitute a plane in the second spatial direction, and the third planar flag information indicates that the occupied child-nodes of the current node constitute a plane in the third spatial direction, determining third plane position information of the current node in the third spatial direction; and writing the third plane position information into the bitstream after the third planar flag information is written into the bitstream.

In a twenty-third clause, according to the eighteenth clause or the nineteenth clause, the method further includes:

in a case where the first planar flag information indicates that the occupied child-nodes of the current node constitute a plane in the first spatial direction, after the first planar flag information is encoded, encoding first plane position information of the current node in the first spatial direction; and in a case where the first planar flag information indicates that the occupied child-nodes of the current node do not constitute a plane in the first spatial direction, after the first planar flag information is encoded, skipping encoding of the first plane position information;

in a case where the second planar flag information indicates that the occupied child-nodes of the current node constitute a plane in the second spatial direction, after the second planar flag information is encoded, encoding second plane position information of the current node in the second spatial direction; and in a case where the second planar flag information indicates that the occupied child-nodes of the current node do not constitute a plane in the second spatial direction, after the second planar flag information is encoded, skipping encoding of the second plane position information; and in a case where the third planar flag information indicates that the occupied child-nodes of the current node constitute a plane in the third spatial direction, after the third planar flag information is encoded, encoding third plane position information of the current node in the third spatial direction; and in a case where the third planar flag information indicates that the occupied child-nodes of the current node do not constitute a plane in the third spatial direction, after the third planar flag information is encoded, skipping encoding of the third plane position information.

In a twenty-fourth clause, according to any one of the nineteenth to twenty-second clauses, the method further includes:

in a case where the first planar flag information indicates that the occupied child-nodes of the current node do not constitute a plane in the first spatial direction, determining that the first planar flag information indicates that a plane constituted by the occupied child-nodes of the current node is perpendicular to the first spatial direction; and/or, in a case where the second planar flag information indicates that the occupied child-nodes of the current node do not constitute a plane in the second spatial direction, determining that the second planar flag information indicates that a plane constituted by the occupied child-nodes of the current node is perpendicular to the second spatial direction; and/or, in a case where the third planar flag information indicates that the occupied child-nodes of the current node do not constitute a plane in the third spatial direction, determining that the third planar flag information indicates that a plane constituted by the occupied child-nodes of the current node is perpendicular to the third spatial direction.

In a twenty-fifth clause, according to any one of the fourteenth to twenty-second clauses, the method further includes:

in a case where the current node meets a plane qualification determination condition in all of the three preset spatial directions, performing a process for determining all planar flag information, and writing the all planar flag information into the bitstream.

In a twenty-sixth clause, according to the twenty-fifth clause, the method further includes:

in a case where the current node does not meet the plane qualification determination condition in all of the three preset spatial directions, for one or two spatial directions that meet the plane qualification determination condition, determining planar flag information of the current node in the one or two spatial directions; and performing encoding processing according to the planar flag information of the current node in the one or two spatial directions.

In a twenty-seventh clause, according to any one of the fourteenth, eighteenth, twentieth to twenty-second clauses, the method further includes:

in a case where a value of a plane position information is a first value, determining that the plane position information indicates that the occupied child-nodes of the current node constitute a high plane in a corresponding spatial direction; and in a case where a value of the plane position information is a second value, determining that the plane position information indicates that the occupied child-nodes of the current node constitute a low plane in a corresponding spatial direction.

The technical solutions in the embodiments of the present disclosure will be clearly described below in combination with the drawings in the embodiments of the present disclosure.

Figure 6:
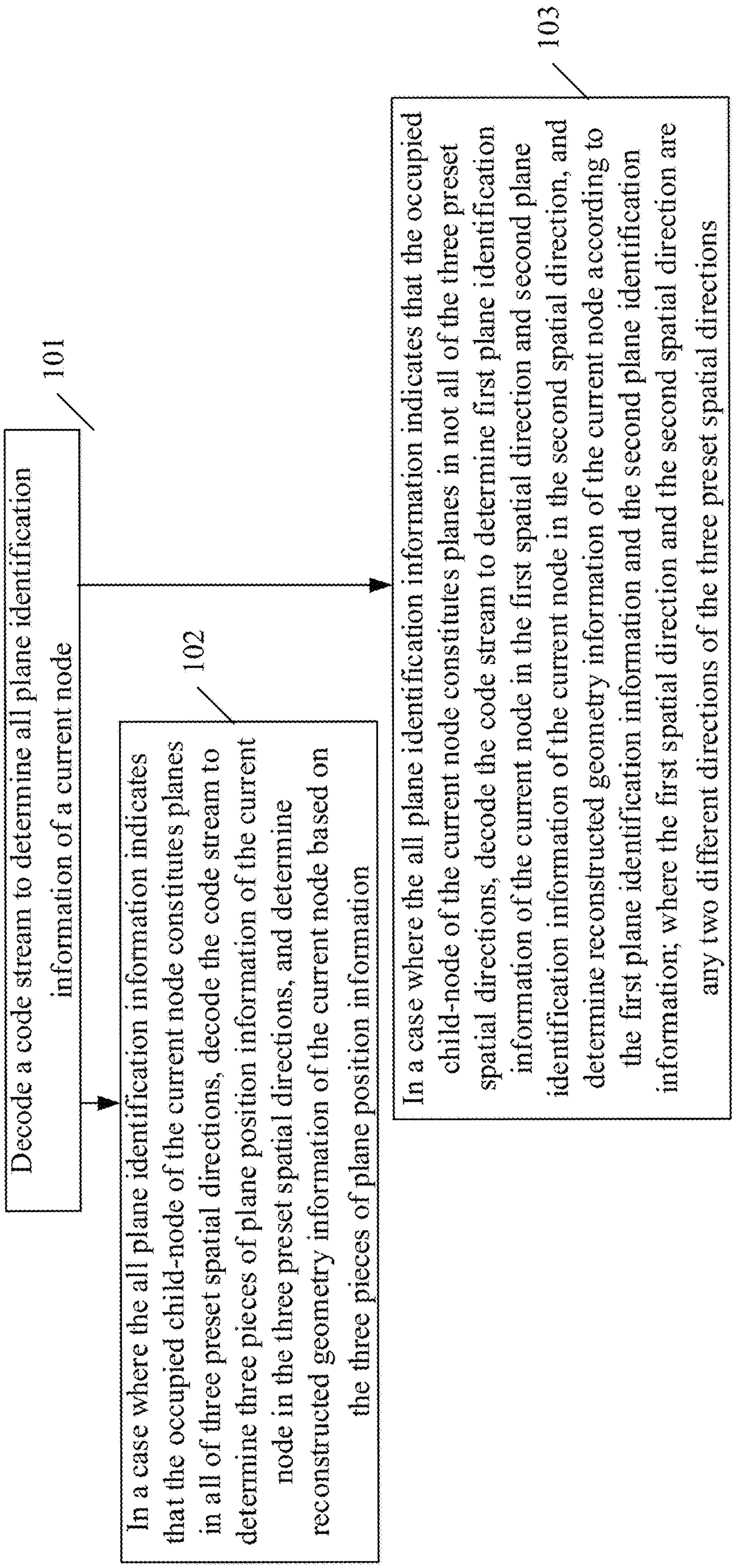
FIG. 6 is a schematic flowchart of an implementation of a point cloud decoding method proposed in the embodiments of the present disclosure.

The embodiments of the present disclosure propose a point cloud decoding method. FIG. 6 is a schematic flow chart of an implementation of a point cloud decoding method proposed in the embodiments of the present disclosure. As shown in FIG. 6, the method for a decoder to perform point cloud decoding processing may include the following step 101 to step 103.

In step 101, a bitstream is decoded, and all planar flag information of a current node is determined.

In the embodiments of the present disclosure, the decoder may first decode a bitstream and then determine all planar flag information of a current node. The all planar flag information may indicate whether occupied child-nodes of the current node constitute planes in all of three preset spatial directions. That is, through the all planar flag information corresponding to the current node, it can be determined whether a plane constituted by the occupied child-nodes of the current node is perpendicular to each of the three preset spatial directions.

It can be understood that, in the embodiments of the present disclosure, in a case where the occupied child-nodes of the current node do not constitute a plane in one spatial direction of the three preset spatial directions, it may be considered that the plane constituted by the occupied child-nodes of the current node is perpendicular to this spatial direction.

It should be noted that, in the embodiments of the present disclosure, the all planar flag information may be used to determine whether the occupied child-nodes of the current node constitute planes in all of the three preset spatial directions. In some embodiments, at an encoding side, an encoder may assign a value to the all planar flag information. For example, when a value of the all planar flag information is a numerical value, it is considered that the occupied child-nodes of the current node constitute planes in all of the three preset spatial directions; and when a value of the all planar flag information is another numerical value, it is considered that the occupied child-nodes of the current node do not all constitute planes in the three preset spatial directions.

In other words, in the embodiments of the present disclosure, in a decoder, when whether the occupied child nodes of the current node constitute planes in all of the three preset spatial directions is determined, it may be determined through the all planar flag information. The all planar flag information may be represented by a flag bit, all_planar_flag or may also be represented by another flag bit, all_planar_flagnot_all_planar_flag.

It can be understood that, in the embodiments of the present disclosure, a value of the all planar flag information may be 0 or 1.

Correspondingly, in the embodiments of the present disclosure, in a case where determined all planar flag information is a flag bit, all_planar_flag, when a value of the flag bit, all_planar_flag is 0, it may be determined that the all planar flag information indicates that the occupied child-nodes of the current node do not all constitute planes in the three preset spatial directions; and when a value of the flag bit, all_planar_flag is 1, it may be determined that the all planar flag information indicates that the occupied child-nodes of the current constitute planes in all of the three preset spatial directions.

Correspondingly, in the embodiments of the present disclosure, in a case where determined all planar flag information is a flag bit, all_planar_flagnot_all_planar_flag, when a value of the flag bit, all_planar_flagnot_all_planar_flag, is 1, it may be determined that the all planar flag information indicates that the occupied child-nodes of the current node do not all constitute planes in the three preset spatial directions, and when a value of the flag bit, all_planar_flag, is 0, it may be determined that the all planar flag information indicates that the occupied child-nodes of the current node constitute planes in all of the three preset spatial directions.

Further, in the embodiments of the present disclosure, the three preset spatial directions may be three different directions in space that are perpendicular to each other. Taking a spatial coordinate axis as an example, the three preset spatial directions may be an x-axis direction, a y-axis direction, and a z-axis direction.

It can be understood that, in the embodiments of the present disclosure, the current node may be a point in the point cloud to be decoded.

Further, in the embodiments of the present disclosure, before the all planar flag information is acquired, whether the current node meets a plane qualification determination condition in the three preset spatial directions is determined respectively. In a case where the current node meets the plane qualification determination condition in all of the three preset spatial directions, the process for determining the all planar flag information is executed.

Correspondingly, in the embodiments of the present disclosure, after whether the current node meets the plane qualification determination condition in the three preset spatial directions is determined respectively, in a case where the current node does not meet the plane qualification determination condition in all of the three preset spatial directions, the process for determining the all planar flag information will no longer be executed. Instead, for one or two spatial directions that meet the plane qualification determination condition, a bitstream is decoded to determine the planar flag information of the current node in the one or two spatial directions that meet the plane qualification determination condition; and then, reconstructed geometry information of the current node may be determined according to the planar flag information of the current node in the one or two spatial directions.

In other words, in the embodiments of the present disclosure, a prerequisite for determining the all planar flag information of the current node by decoding the bitstream is whether the current node meets the plane qualification determination condition in the three preset spatial directions.

In step 102: in a case where the all planar flag information indicates that the occupied child-nodes of the current node constitute planes in all of the three preset spatial directions, the bitstream is decoded, three pieces of plane position information of the current node in the three preset spatial directions are determined, and reconstructed geometry information of the current node is determined based on the three pieces of plane position information.

In the embodiments of the present disclosure, after the all planar flag information of the current node is determined, in a case where the all planar flag information indicates that the occupied child-nodes of the current node constitute planes in all of three preset spatial directions, a bitstream is decoded, three pieces of plane position information of the current node in the three preset spatial directions are determined, and then reconstructed geometry information of the current node may be determined based on the three pieces of plane position information.

It should be noted that, in the embodiments of the present disclosure, in a case where the all planar flag information indicates that the occupied child-nodes of the current node constitute planes in all of three preset spatial directions, it may be stated that a position of the occupied child-nodes of the current node constitute planes in all of the three preset spatial directions, that is, the current node is determined to be a three-plane node, and therefore it may be considered that the occupied child-nodes of the current node may constitute a plane in any one preset spatial direction.

It can be understood that, in the embodiments of the present disclosure, for one spatial direction of the three preset spatial directions, in a case where it has been determined that the occupied child-nodes of the current node may constitute a plane in the preset spatial direction, it may directly default that the planar flag information of the current node in this spatial direction indicates that the occupied child-nodes of the current node constitute a plane in this spatial direction. Therefore, there is no need to decode the planar flag information of the current node in the spatial direction, but the three pieces of plane position information of the current node in the three preset spatial directions continue to be determined, and then the reconstructed geometry information of the current node may be determined based on the three pieces of plane position information.

Further, in the embodiments of the present disclosure, in a case where the all planar flag information indicates that the occupied child-nodes of the current node constitute planes in all of the three preset spatial directions, three pieces of planar flag information of the current node in the three preset spatial directions may be set to respectively indicate that the occupied child-nodes of the current node constitute planes in the three preset spatial directions.

It can be understood that in the embodiments of the present disclosure, for one spatial direction of the three preset spatial directions, in a case where it has been determined that the occupied child-nodes of the current node may constitute a plane in this spatial direction, the planar flag information of the current node in this spatial direction may be directly set to indicate that the occupied child-nodes of the current node constitute a plane in this spatial direction. Therefore, there is no need to decode the planar flag information of the current node in this spatial direction, but three pieces of plane position information of the current node in the three preset spatial directions continue to be determined, and then the reconstructed geometry information of the current node may be determined based on the three pieces of plane position information.

It should be noted that, in the embodiments of the present disclosure, in a case where the planar flag information of the current node in a spatial direction indicates that the occupied child-nodes of the current node constitute a plane in this spatial direction, it may be further determined the plane position information of the current node in this spatial direction; and in a case where the planar flag information of the current node in a spatial direction indicates that the occupied child-nodes of the current node do not constitute a plane in this spatial direction, it may be determined that the current node does not have the plane position information in this spatial direction.

It should be noted that, in the embodiments of the present disclosure, for one spatial direction of the three preset spatial directions, the planar flag information of this spatial direction may indicate whether the occupied child-nodes of the current node constitute a plane in this spatial direction, that is, through the planar flag information corresponding to the current node, it may be determined whether a plane constituted by the occupied child-nodes of the current node is perpendicular to this spatial direction. In a case where the occupied child-node of the current node does not constitute a plane in this spatial direction, it may be considered that a plane constituted by the occupied child-nodes of the current node is perpendicular to this spatial direction.

It should be noted that, in the embodiments of the present disclosure, the planar flag information may be used to determine whether the occupied child-nodes of the current node constitute a plane in a corresponding spatial direction. In some embodiments, at an encoding side, an encoder may assign a value to the planar flag information. For example, when a value of the planar flag information is a numerical value, it is considered that the occupied child-nodes of the current node constitute a plane in a corresponding spatial direction. When a value of the planar flag information is another numerical value, it is considered that the occupied child-nodes of the current node do not constitute a plane in a corresponding spatial direction, that is, a plane constituted by the occupied child-nodes of the current node is perpendicular to this spatial direction.

In other words, in the embodiments of the present disclosure, in a decoder, when whether the occupied child-nodes of the current node constitute a plane in a spatial direction is determined, it may be determined through the planar flag information of this spatial direction. The planar flag information may be represented by a flag bit, occ_single_plane. An occ_single_plane[k] may be used to indicate whether the occupied child-nodes of the current node constitute a plane in a (k+1)-th spatial direction, and a value of k may be 0, 1, or 2.

Exemplarily, in the embodiments of the present disclosure, occ_single_plane[0] may characterize first planar flag information of a current node in a first spatial direction, occ_single_plane[1] may characterize second planar flag information of a current node in a second spatial direction, and occ_single_plane[2] may characterize third planar flag information of a current node in a third spatial direction.

It can be understood that, in the embodiments of the present disclosure, a value of the planar flag information, occ_single_plane[k], may be 0 or 1.

Correspondingly, in the embodiments of the present disclosure, in a case where determined planar flag information is a flag bit, occ_single_plane[k], when a value of the flag bit, occ_single_plane[k], is 0, it may be determined that the planar flag information indicates that the occupied child-nodes of the current node do not constitute a plane in a (k+1)-th spatial direction; and when a value of the flag bit, occ_single_plane[k], is 1, it may be determined that the planar flag information indicates that the occupied child-nodes of the current node constitute a plane in a (k+1)-th spatial direction.

It can be understood that in a case where a value of all_planar_flag obtained by decoding is 1, it may be determined that the current node constitutes planes in all of the three preset spatial directions. At this time, there are no three pieces of planar flag information of the current node in the three preset spatial directions in the bitstream. This is because at an encoding side, the three pieces of planar flag information in the three preset spatial directions is not written into the bitstream. Therefore, the three pieces of planar flag information of the current node in the three preset spatial directions may be directly set to indicate that the occupied child-nodes of the current node constitute planes in the three preset spatial directions. That is, a value of the first planar flag information, occ_single_plane[0] in the first spatial direction, is set to 1, a value of the second planar flag information, occ_single_plane[1] in the second spatial direction, is set to 1, and a value of the third planar flag information occ_single_plane[2], in the third spatial direction is set to 1.

In step 103: in a case where the all planar flag information indicates that the occupied child-nodes of the current node do not all constitute planes in the three preset spatial directions, the bitstream is decoded, first planar flag information of the current node in the first spatial direction and second planar flag information of the current node in the second spatial direction are determined, and reconstructed geometry information of the current node is determined according to the first planar flag information and the second planar flag information; where the first spatial direction and the second spatial direction are any two different directions of the three preset spatial directions.

In the embodiments of the present disclosure, after the all planar flag information of the current node is determined, in a case where the all planar flag information indicates that the occupied child-nodes of the current node do not all constitute planes in the three preset spatial directions, the bitstream may continue to be decoded, the first planar flag information of the current node in the first spatial direction and the second planar flag information of the current node in the second spatial direction is further determined, and then the reconstructed geometry information of the current node may be determined according to the first planar flag information and the second planar flag information.

It should be noted that, in the embodiments of the present disclosure, the first spatial direction and the second spatial direction are any two different directions of the three preset spatial directions. Assuming that the three preset spatial directions may be an x-axis direction, a y-axis direction and a z-axis direction respectively, the first spatial direction and the second spatial direction may be any two directions of the x-axis direction, the y-axis direction and the z-axis direction. For example, the first spatial direction may be the x-axis direction, and the second spatial direction may be the y-axis direction; or, the first spatial direction may be the z-axis direction, and the second spatial direction may be the y-axis direction; or, the first spatial direction may be the z-axis direction, and the second spatial direction may be the x-axis direction, etc, which is not limited specifically in the embodiments of the present disclosure.

Further, in the embodiments of the present disclosure, in a case where the all planar flag information indicates that the occupied child-nodes of the current node do not all constitute planes in the three preset spatial directions, it may be considered that for at least one spatial direction of the three preset spatial directions, the occupied child-nodes of the current node do not constitute a plane in the at least one spatial direction.

It can be understood that in the embodiments of the present disclosure, a case where the all planar flag information indicates a possible occurrence in which the occupied child-nodes of the current node do not all constitute planes in the three preset spatial directions, may include that: 1. the occupied child-nodes of the current node do not constitute planes in two spatial directions, but only constitute a plane in the remaining spatial direction; 2. the occupied child-nodes of the current node constitute planes in two spatial directions, but does not constitute a plane in the remaining spatial direction.

It should be noted that, in the embodiments of the present disclosure, in a case where the first planar flag information indicates that the occupied child-nodes of the current node do not constitute a plane in the first spatial direction, it may be determined that the planar flag information indicates that the plane constituted by the occupied child-nodes of the current node is perpendicular to the first spatial direction; in a case where the second planar flag information indicates that the occupied child-nodes of the current node do not constitute a plane in the second spatial direction, it may be determined that the second planar flag information indicates the plane constituted by the occupied child-nodes of the current node is perpendicular to the second spatial direction; and in a case where the third planar flag information indicates that the occupied child-nodes of the current node do not constitute a plane in the third spatial direction, it may be determined that the third planar flag information indicates that the plane constituted by the occupied child-nodes of the current node is perpendicular to the third spatial direction.

In other words, in the embodiments of the present disclosure, in a case where the planar flag information in a spatial direction indicates that the occupied child-nodes of the current node do not constitute a plane in this spatial direction, it may be considered that the planar flag information in this spatial direction indicates that the plane constituted by the occupied child-nodes of the current node is perpendicular to this spatial direction. For example, in a case where the planar flag information in the x-axis direction indicates that the occupied child-nodes of the current node do not constitute a plane in the x-axis direction, it may be considered that the planar flag information in the x-axis direction indicates the plane constituted by the occupied child-nodes of the current node is perpendicular to the x-axis direction.

Further, in the embodiments of the present disclosure, in a case where the all planar flag information indicates that the occupied child-nodes of the current node do not all constitute planes in the three preset spatial directions, first planar flag information of the current node in a first spatial direction and second planar flag information of the current node in a second spatial direction may be determined first; and then it may be further determined whether it is necessary to decode third planar flag information of the current node in a third spatial direction, according to the first planar flag information and the second planar flag information.

Further, in the embodiments of the present disclosure, when the reconstructed geometry information of the current node is determined according to the first planar flag information and the second planar flag information, in a case where the first planar flag information indicates that the occupied child-nodes of the current node constitute a plane in the first spatial direction, and at the same time, the second planar flag information indicates that the occupied child-nodes of the current node constitute a plane in the second spatial direction, the bitstream may continue to be decoded; the first plane position information of the current node in the first spatial direction and the second plane position information of the current node in the second spatial direction are further determined; and then the reconstructed geometry information of the current node may be determined based on the first plane position information and the second plane position information.

It can be understood that in the embodiments of the present disclosure, in a case where a value of occ_single_plane[0] obtained by decoding is 1, it may be determined that the first planar flag information indicates that the occupied child-nodes of the current node constitute a plane in the first spatial direction; and in a case where a value of occ_single_plane[1] obtained by decoding is 1, it may be determined that the second planar flag information indicates that the occupied child-nodes of the current node constitute a plane in the second spatial direction.

It should be noted that, in the embodiments of the present disclosure, after it is determined that the all planar flag information indicates that the occupied child-nodes of the current node do not all constitute planes in the three preset spatial directions, in a case where the first planar flag information and the second planar flag information indicate that the occupied child-nodes of the current node constitute planes in both the first spatial direction and the second spatial direction, it may be directly defaulted that the third planar flag information of the current node in the third spatial direction indicates that the occupied child-nodes of the current node do not constitute a plane in the third spatial direction, that is, it is directly defaulted that the planar flag information in the third spatial direction indicates that the plane constituted by the occupied child-nodes of the current node is perpendicular to the third spatial direction. Therefore, there is no need to decode the third planar flag information of the current node in the third spatial direction, but the first plane position information of the current node in the first spatial direction and the second plane position information in the second spatial direction continues to be determined, and then the reconstructed geometry information of the current node may be determined according to the first plane position information and the second plane position information.

It can be understood that in the embodiments of the present disclosure, after it is determined that the all planar flag information indicates that the occupied child-nodes of the current node do not all constitute planes in the three preset spatial directions, in a case where the first planar flag information and the second planar flag information indicate that the occupied child-nodes of the current node constitute planes in both the first spatial direction and the second spatial direction, the third planar flag information of the current node in the third spatial direction may be set to indicate that the occupied child-nodes of the current node do not constitute a plane in the third spatial direction, that is, the planar flag information in the third spatial direction may be set to indicate that the plane constituted by the occupied child-nodes of the current node is perpendicular to the third spatial direction.

It should be noted that, in the embodiments of the present disclosure, the third spatial direction may be a direction of the three preset spatial directions other than the first spatial direction and the second spatial direction. Assuming that the three preset spatial directions may be an x-axis direction, a y-axis direction and a z-axis direction respectively, in a case where the first spatial direction may be the x-axis direction and the second spatial direction may be the y-axis direction, the third spatial direction may be the z-axis; and in a case where the first spatial direction may be the z-axis direction and the second spatial direction may be the y-axis direction, the third spatial direction may be the x-axis, which is not limited specifically in the embodiments of the present disclosure.

In other words, in the embodiments of the present disclosure, in a case where the all planar flag information indicates that the occupied child-nodes of the current node do not all constitute planes in the three preset spatial directions, if the first planar flag information and the second planar flag information indicate that the occupied child-nodes of the current node constitute planes in both the first spatial direction and the second spatial direction, and at this time, there is no third planar flag information in the bitstream. This is because at an encoding side, the third planar flag information is not written into the bitstream. Therefore, a decoding processing may be not performed on the third planar flag information, and instead, the third planar flag information may be directly set to indicate that the occupied child-nodes of the current node do not constitute a plane in the third spatial direction. That is, the planar flag information in the third spatial direction may be set to indicate that the plane constituted by the occupied child-nodes of the current node is perpendicular to the third spatial direction.

It can be seen that, in the embodiments of the present disclosure, in a case where a value of all_planar_flag is 0, if a value of occ_single_plane[0] obtained by decoding is 1, and a value of occ_single_plane[1] is also 1, a value of occ_single_plane[2] may be directly set to 0.

Further, in the embodiments of the present disclosure, when the reconstructed geometry information of the current node is determined according to the first planar flag information and the second planar flag information, in a case where the first planar flag information indicates that the occupied child-nodes of the current node do not constitute a plane in the first spatial direction, and/or the second planar flag information indicates that the occupied child-nodes of the current node do not constitute a plane in the second spatial direction, the bitstream may continue to be decoded, the third planar flag information of the current node in the third spatial direction may be further determined; and then the reconstructed geometry information of the current node may be determined based on the third planar flag information.

It can be understood that in the embodiments of the present disclosure, in a case where a value of occ_single_plane[0] obtained by decoding is 0, it may be determined that the first planar flag information indicates that the occupied child-nodes of the current node do not constitute a plane in the first spatial direction; and in a case where a value of occ_single_plane[1] obtained by decoding is 0, it may be determined that the second planar flag information indicates that the occupied child-nodes of the current node do not constitute a plane in the second spatial direction. The third spatial direction may be a direction of the three preset spatial directions other than the first spatial direction and the second spatial direction.

It should be noted that, in the embodiments of the present disclosure, after it is determined that the all planar flag information indicates that the occupied child-nodes of the current node do not all constitute planes in the three preset spatial directions, in a case where the first planar flag information and/or the second planar flag information indicates that the occupied child-nodes of the current node do not constitute a plane in the first spatial direction and/or the second spatial direction, i.e., indicating that the occupied child-nodes of the current node do not constitute a plane in one or two spatial directions of the first spatial direction and the second spatial direction, it is necessary to further determine the third planar flag information of the current node in the third spatial direction, and then determine whether the occupied child-nodes of the current node constitute a plane in the third spatial direction.

In other words, in the embodiments of the present disclosure, in a case where a value of all_planar_flag is 0, if a value of occ_single_plane[0] obtained by decoding is 0, and/or a value of occ_single_plane[1] is 0, that is, the value of occ_single_plane[0] and the value of occ_single_plane[1] are not both 1, it is necessary to further decode the bitstream to determine occ_single_plane[2].

Exemplarily, a possible implementation is that: in a case where the first planar flag information indicates that the occupied child-nodes of the current node constitute a plane in the first spatial direction, and the second planar flag information indicates that the occupied child-nodes of the current node do not constitute a plane in the second spatial direction, and the third planar flag information indicates that the occupied child-nodes of the current node do not constitute a plane in the third spatial direction, the first plane position information of the current node in the first spatial direction may be further determined; and then the reconstructed geometry information of the current node may be determined based on the first plane position information.

In other words, in the embodiments of the present disclosure, in a case where a value of all_planar_flag is 0, if a value of occ_single_plane[0] obtained by decoding is 1, a value of occ_single_plane[1] obtained by decoding is 0, and a value of occ_single_plane[2] obtained by decoding is 0, it is necessary to determine the reconstructed geometry information of the current node through the first plane position information of the current node in the first spatial direction.

Exemplarily, a possible implementation is that: in a case where the first planar flag information indicates that the occupied child-nodes of the current node constitute a plane in the first spatial direction, and the second planar flag information indicates that the occupied child-nodes of the current node do not constitute a plane in the second spatial direction, and the third planar flag information indicates that the occupied child-nodes of the current node constitute a plane in the third spatial direction, the first plane position information of the current node in the first spatial direction and the third plane position information of the current node in the third spatial direction may be further determined; and then the reconstructed geometry information of the current node may be determined based on the first plane position information and the third plane position information.

In other words, in the embodiments of the present disclosure, in a case where a value of all_planar_flag is 0, if a value of occ_single_plane[0] obtained by decoding is 1, a value of occ_single_plane[1] obtained by decoding is 0, and a value of occ_single_plane[2] obtained by decoding is 1, it is necessary to determine the reconstructed geometry information of the current node through the first plane position information of the current node in the first spatial direction and the third plane position information of the current node in the third spatial direction.

Exemplarily, a possible implementation is that: in a case where the first planar flag information indicates that the occupied child-nodes of the current node do not constitute a plane in the first spatial direction, and the second planar flag information indicates that the occupied child-nodes of the current node constitute a plane in the second spatial direction, and the third planar flag information indicates that the occupied child-nodes of the current node do not constitute a plane in the third spatial direction, the second plane position information of the current node in the second spatial direction may be further determined; and then the reconstructed geometry information of the current node may be determined based on the second plane position information;

In other words, in the embodiments of the present disclosure, in a case where a value of all_planar_flag is 0, if a value of occ_single_plane[0] obtained by decoding is 0, a value of occ_single_plane[1] obtained by decoding is 1, and a value of occ_single_plane[2] obtained by decoding is 0, it is necessary to determine the reconstructed geometry information of the current node through the second plane position information of the current node in the second spatial direction.

Exemplarily, a possible implementation is that: in a case where the first planar flag information indicates that the occupied child-nodes of the current node do not constitute a plane in the first spatial direction, and the second planar flag information indicates that the occupied child-nodes of the current node constitute a plane in the second spatial direction, and the third planar flag information indicates that the occupied child-nodes of the current node constitute a plane in the third spatial direction, the second plane position information of the current node in the second spatial direction and the third plane position information of the current node in the third spatial direction may be further determined; and then the reconstructed geometry information of the current node may be determined based on the second plane position information and the third plane position information.

In other words, in the embodiments of the present disclosure, in a case where a value of all_planar_flag is 0, if a value of occ_single_plane[0] obtained by decoding is 0, a value of occ_single_plane[1] obtained by decoding is 1, and a value of occ_single_plane[2] obtained by decoding is 1, it is necessary to determine the reconstructed geometry information of the current node through the second plane position information of the current node in the second spatial direction and the third plane position information of the current node in the third spatial direction.

Exemplarily, a possible implementation is that: in a case where the first planar flag information indicates that the occupied child-nodes of the current node do not constitute a plane in the first spatial direction, the second planar flag information indicates that the occupied child-nodes of the current node do not constitute a plane in the second spatial direction, and the third planar flag information indicates that the occupied child-nodes of the current node constitute a plane in the third spatial direction, the third plane position information of the current node in the third spatial direction may be further determined; and then the reconstructed geometry information of the current node may be determined based on the third plane position information.

In other words, in the embodiments of the present disclosure, in a case where a value of all_planar_flag is 0, if a value of occ_single_plane[0] obtained by decoding is 0, a value of occ_single_plane[1] obtained by decoding is 0, and a value of occ_single_plane[2] obtained by decoding is 1, it is necessary to determine the reconstructed geometry information of the current node through the third plane position information of the current node in the third spatial direction.

It should be noted that, in the embodiments of the present disclosure, when the plane position information is acquired, in a case where the first planar flag information indicates that the occupied child-nodes of the current node constitute a plane in the first spatial direction, the bitstream is decoded and the first plane position information of the current node in the first spatial direction is determined; otherwise, the decoding of the first plane position information is skipped. In a case where the second planar flag information indicates that the occupied child-nodes of the current node constitute a plane in the second spatial direction, the bitstream is decoded, and the second plane position information of the current node in the second spatial direction is determined; otherwise, the decoding of the second plane position information is skipped. In a case where the third planar flag information indicates that the occupied child-nodes of the current node constitute a plane in the third spatial direction, the bitstream is decoded, and the third plane position information of the current node in the third spatial direction is determined; otherwise, the decoding of the third plane position information is skipped.

It can be understood that, in the embodiments of the present disclosure, for one spatial direction of the three preset spatial directions, the plane position information of this spatial direction may indicate a position of the plane constituted by the occupied child-nodes of the current node in this spatial direction, that is, a specific position of the plane constituted by the occupied child-nodes of the current node may be determined through the plane position information corresponding to the current node.

It should be noted that, in the embodiments of the present disclosure, the plane position information may be used to determine the position of the plane constituted by the occupied child-nodes of the current node in a corresponding spatial direction. In some embodiments, at an encoding side, an encoder may assign a value to the plane position information. For example, when a value of the plane position information is a numerical value, it is considered that the position of the plane constituted by the occupied child-nodes of the current node in a corresponding spatial direction is at a high plane and when a value of the plane position information is another numerical value, it is considered that a position of the plane constituted by the occupied child-nodes of the current node in the corresponding spatial direction is at a low plane.

In other words, in the embodiments of the present disclosure, in a decoder, when a position of the plane constituted by the occupied child-nodes of the current node in a spatial direction is determined, it may be determined through the plane position information of this spatial direction. The plane position information may be represented by a flag bit, plane_position. A plane_position [k] may be used to indicate the position of the plane constituted by the occupied child-nodes of the current node in a (k+1)-th spatial direction, and a value of k may be 0, 1, or 2.

Exemplarily, in the embodiments of the present disclosure, plane_position [0] may characterize the first plane position information of the current node in the first spatial direction; plane_position [1] may characterize the second plane position information of the current node in the second spatial direction, and plane_position [2] may characterize the third plane position information of the current node in the third spatial direction.

It can be understood that, in the embodiments of the present disclosure, a value of the plane position information, plane_position [k], may be 0 or 1.

Further, in the embodiments of the present disclosure, in a case where a value of the plane position information is a first value (e.g., 1), it may be determined that the plane position information indicates that the occupied child-nodes of the current node constitute a high plane in a corresponding spatial direction; and in a case where a value of the plane position information is a second value (e.g., 0), it may be determined that the plane position information indicates that the occupied child-nodes of the current node constitute a low plane in a corresponding spatial direction.

Correspondingly, in the embodiments of the present disclosure, in a case where determined plane position information is a flag bit, plane_position [k], when a value of the flag bit, plane_position [k], is 0, it may be determined that the plane position information indicates that the plane constituted by the occupied child-nodes of the current node in the (k+1)-th spatial direction is a low plane, and when a value of the flag bit, plane_position [k], is 1, it may be determined that the plane position information indicates that the plane constituted by the occupied child-nodes of the current node in the (k+1)-th spatial direction is a high plane.

In summary, the point cloud decoding method proposed by the steps 101 to 103 mentioned above is a point cloud planar mode decoding method. A flag bit, all_planar_flag (i.e., all planar flag information), is introduced in the point cloud geometry planar encoding mode. Herein, when a value of all_planar_flag is 1, it represents that occupied child-nodes of a current node constitute planes in all of three preset spatial directions. At this time, values of three pieces of planar flag information, i.e., occ_single_plane[0], occ_single_plane[1] and occ_single_plane[2], may be directly inferred to be 1, that is, it may directly default that the three pieces of planar flag information of the current node in the three preset spatial directions indicate respectively that the occupied child-nodes of the current node constitute planes in the three preset spatial directions, or it may be directly set that the three pieces of planar flag information of the current node in the three preset spatial directions indicate respectively that the occupied child-nodes of the current node constitute planes in the three preset spatial directions. When a value of all_planar_flag is 0, it represents that the occupied child-nodes of the current node do not constitute a plane in at least one spatial direction. At this time, two pieces of planar flag information in two spatial directions of the three preset spatial directions may be first decoded and determined. In a case where values of the two pieces of planar flag information are both 1, that is, the two pieces of planar flag information respectively indicate that the occupied child-nodes of the current node constitute planes in both the two spatial directions, a value of the remaining planar flag information may be directly inferred to be 0, that is, it may directly default that the flag information of the current node in the third spatial direction indicates that the occupied child-nodes of the current node constitute a plane in the third spatial direction, or, it may be directly set that the planar flag information of the current node in the third spatial direction indicates that the occupied child-nodes of the current node constitute a plane in the third spatial direction. By decoding the planar flag in this way, a number of binary symbols required to transmit the planar flag bit, occ_single_plane [axisIdx], may be significantly reduced, thereby improving the geometry coding efficiency of the planar mode.

Exemplarily, in the embodiments of the present disclosure, a point cloud standard text before modification is as shown in Table 1, and a modified standard text is as shown in Table 2.

TABLE 1

| | Descriptor | Semantics |
|---|---|---|
| occupancy__tree__node( Lvl, NodeIdx) { | | |
| if( occ__subtree__qp__offset__present ) { | | |
| occ__subtree__qp__offset__abs[ Ns ] [ Nt ] [ Nv ] | ae(v) | 9.2.13.2 |
| if( occ__subtree__qp__offset__abs[ Ns ][ Nt ][ Nv ] ) | | |
| occ__subtree__qp__offset__sign[ Ns ][ Nt ][ Nv ] | ae(v) | 9.2.13.2 |
| } | | |
| if( occtree__planar__enabled ){ | | |
| if (MultiPlanarEligible) | | |
| multi__planar__flag | | |
| for( k = 0; k < 3; k++ ) | | |
| if( PlanarEligible[ k ] ) { | | 9.2.10.4 |
| if (¬PlanarInferred [ k ] ) | | |
| occ__single__plane[ k ] | ae(v) | 9.2.10.2 |
| if( occ__single__plane[ k ] ) | | |
| occ__plane__pos[ k ] | ae(v) | 9.2.10.2 |
| } | | |
| } | | |
| if( occtree__direct__coding__mode && DirectNodePresent ) | | 9.2.11.3.2 |
| occ__direct__node | ae(v) | 9.2.11.2 |
| if( occ__direct__node ) | | |
| occupancy__tree__direct__node( ) | | |
| else { | | |
| if( OccMaybeSingleChild ) | | 9.2.5.8 |
| occ__single__child | ae(v) | 9.2.5.2 |
| if( occ__single__child ) | | |
| for( k = 0; k < 3; k++ ) | | |
| if( OccFreeAxis[ k ] ) | | |
| occupancy__idx[k] | ae(v) | 9.2.5.2 |
| if( OccMapPresent ) | | 9.2.5.9 |
| if( occtree__bitwise__occupancy ) { | | |
| for( i = 0; i < 8; i++ ) | | |
| if( OccBitPresent[ ]] ] | | 9.2.9.3 |
| occupancy__bit[ I ] | ae(v) | 9.2.5.2 |
| } else | | |
| occupancy__byte | de(v) | 9.2.5.2 |
| if( TerminalNode && geom__dup__point__counts__enabled ) | | 9.2.5.5 |
| for( child = 0; child < OccChildCnt; child++ ) | | |
| occ__dup__point__cnt[ child ] | ae(v) | 9.2.5.2 |
| } | | |
| } | | |

TABLE 2

| | Descriptor | Semantics |
|---|---|---|
| occupancy__tree__node( Lvl, NodeIdx ) { | | |
| if( occ__subtree__qp__offset__present ) { | | |
| occ__subtree__qp__offset__abs[ Ns ][ Nt ][ Nv ] | ae(v) | 9.2.13.2 |
| if( occ__subtree__qp__offset__abs[ Ns ][ Nt ][ Nv ] ) | | |
| occ__subtree__qp__offset__sign[ Ns ][ Nt ][ Nv ] | ae(v) | 9.2.13.2 |
| } | | |
| if( occtree__planar__enabled ){ | | |
| if(PlanarEligible[0] && PlanarEligible[1] && PlanarEligible[2]) | | |
| all__planar__flag | ae(v) | |

TABLE 2-continued

| | Descriptor | Semantics |
|---|---|---|
| if(all_planar_flag){ | | |
| for( k = 0; k < 3; k++ ) | | |
| occ_plane_pos[ k ] | ae(v) | |
| }else{ | | |
| for( k = 0; k < 3; k++ ) | | |
| if( PlanarEligible[ k ] ) { | | 9.2.10.4 |
| if ( PlanarInferred [ k ] ) | | |
| occ_single_plane[ k ] | ae(v) | 9.2.10.2 |
| if( occ_single_plane[ k ] ) | | |
| occ_plane_pos[ k ] | ae(v) | 9.2.10.2 |
| } | | |
| } | | |
| } | | |
| if( occtree_direct_coding_mode && DirectNodePresent ) | | 9.2.11.3.2 |
| occ_direct_node | ae(v) | 9.2.11.2 |
| if( occ_direct_node ) | | |
| occupancy_tree_direct_node( ) | | |
| else { | | |
| if( OccMaybeSingleChild ) | | 9.2.5.8 |
| occ_single_child | ae(v) | 9.2.5.2 |
| if( occ_single_child ) | | |
| for( k = 0; k < 3; k++ ) | | |
| if( OccFreeAxis[ k ] ) | | |
| occupancy_idx[ k] | ae(v) | 9.2.5.2 |
| if( OccMapPresent ) | | 9.2.5.9 |
| if( occtree_bitwise_occupancy ) { | | |
| for( i = 0; i < 8; i++ ) | | |
| if( OccBitPresent[ I ] ) | | 9.2.9.3 |
| occupancy_bit[ i] | ae(v) | 9.2.5.2 |
| } else | | |
| occupancy_byte | de(v) | 9.2.5.2 |
| if( TerminalNode && geom_dup_point_counts_enabled ) | | 9.2.5.5 |
| for( child = 0; child < OccChildCnt; child++ ) | | |
| occ_dup_point_cnt[ child ] | ae(v) | 9.2.5.2 |
| } | | |
| } | | |

It can be seen that before the modification, a syntax structure is:

```
for( k = 0; k < 3; k++ ) {
    flag[ k ];
    if (flag[ k ])
        pos[ k ];
}
```

After the modification, in a case where the value of all_planar_flag is equal to 0, a corresponding syntax structure is:

```
for( k = 0; k < 2; k++ ) {
    flag[ k ];
    if (flag[ k ])
        pos[ k ];
}
if (flag[ 0 ] == 0 || flag[ 1 ] == 0) {
    flag[ 2 ];
    if (flag[ 2 ])
        pos[ 2 ];
```

The embodiments of the present disclosure disclose a point cloud decoding method, where a decoder decodes a bitstream and determines all planar flag information of a current node. In a case where the all planar flag information indicates that occupied child-nodes of the current node constitute planes in all of three preset spatial directions, the bitstream is decoded and three pieces of plane position information of the current node in the three preset spatial directions are determined, and reconstructed geometry information of the current node is determined based on the three pieces of plane position information. In a case where the all planar flag information indicates that occupied child-nodes of the current node do not all constitute planes in the three preset spatial directions, the bitstream is decoded and first planar flag information of the current node in a first spatial direction and second planar flag information of a current node in the second spatial direction are determined, and reconstructed geometry information of the current node is determined according to the first planar flag information and the second planar flag information. The first spatial direction and the second spatial direction are any two different directions of the three preset spatial directions. It can be seen that, in the embodiments of the present disclosure, all planar flag information, all_planar_flag, is introduced. When a value of all_planar_flag is 1, it represents that the occupied child-nodes of the current node constitute planes in all of the three preset spatial directions, and at this time, there is no need to transmit the three pieces of planar flag information of the current node in the three preset spatial directions in the bitstream; and when a value of all_planar_flag is 0, it represents that the occupied child-nodes of the current node do not constitute a plane in at least one spatial direction, and at this time, two pieces of planar flag information of two spatial directions of the three preset spatial directions may be determined first. In a case where the two pieces of planar flag information respectively indicate that the occupied child-nodes of the current node constitute planes in both the two spatial directions, there is no need to transmit the remaining planar flag information in the bitstream. It can be seen that the point cloud coding method proposed in the embodiments of the present disclosure can reduce complexity, enhance decoding efficiency, and improve video compression performance.

Figure 7:
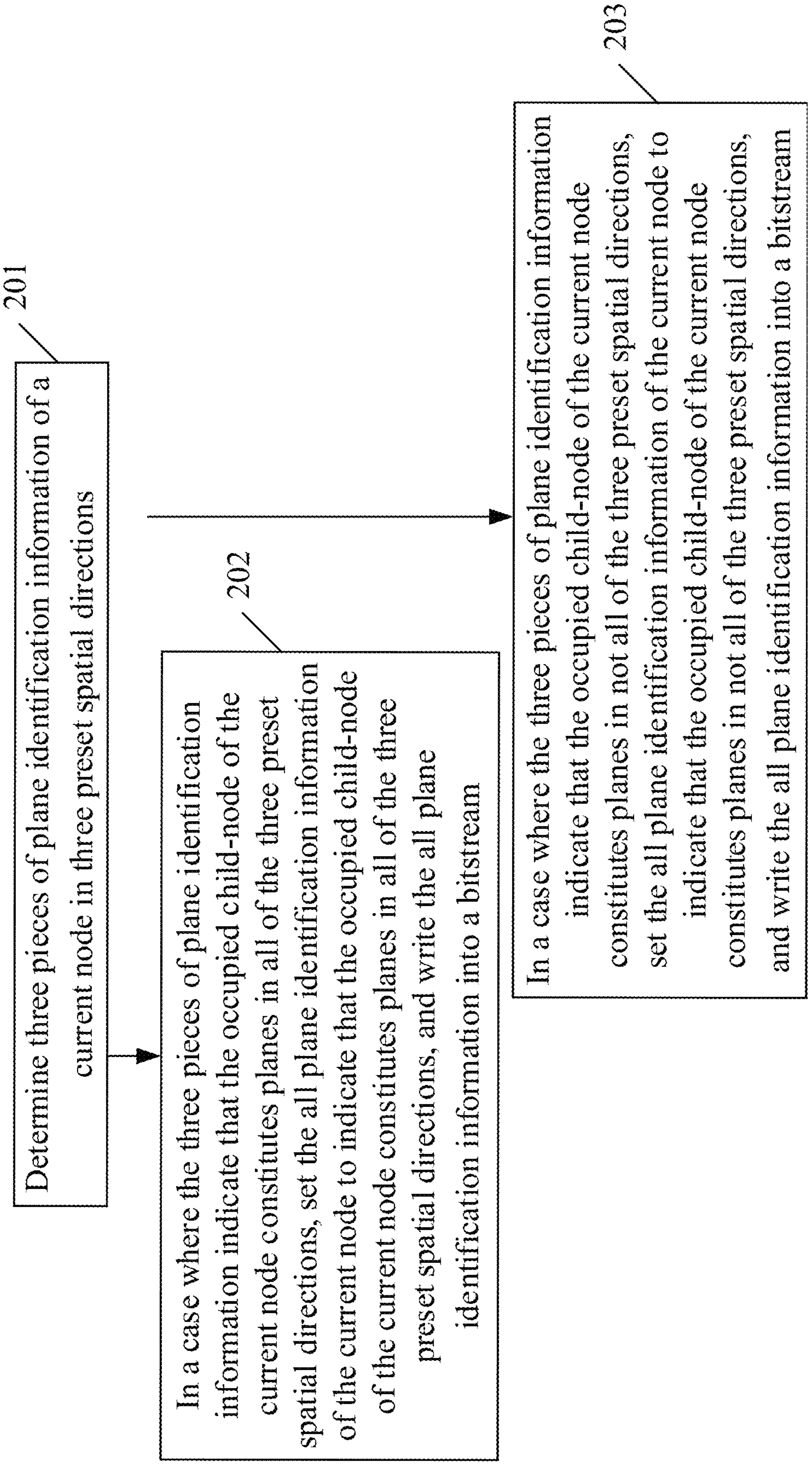
FIG. 7 is a schematic flowchart of an implementation of a point cloud encoding method proposed in the embodiments of the present disclosure.

Based on the embodiments mentioned above, another embodiment of the present disclosure proposes a point cloud encoding method. FIG. 7 is a schematic flow chart of an implementation of a point cloud encoding method proposed in the embodiments of the present disclosure. As shown in FIG. 7, the method for an encoder to perform a point cloud encoding processing may include the following steps 201 to 203.

In step 201: three pieces of planar flag information of a current node in three preset spatial directions are determined.

In the embodiments of the present disclosure, an encoder may first determine three pieces of planar flag information of a current node in three preset spatial directions, respectively.

Further, in the embodiments of the present disclosure, the three preset spatial directions may be three different directions in space that are perpendicular to each other. Taking a spatial coordinate axis as an example, the three preset spatial directions may be an x-axis direction, a y-axis direction, and a z-axis direction.

It can be understood that, in the embodiments of the present disclosure, the current node may be a point in the point cloud to be encoded.

It should be noted that, in the embodiments of the present disclosure, for one spatial direction of the three preset spatial directions, the planar flag information of this spatial direction may indicate whether the occupied child-nodes of the current node constitute a plane in this spatial direction, that is, through the planar flag information corresponding to the current node, it may be determined whether the plane constituted by the occupied child-nodes of the current node is perpendicular to this spatial direction. In a case where the occupied child-nodes of the current node do not constitute a plane in this spatial direction, it may be considered that the plane constituted by the occupied child-nodes of the current node is perpendicular to this spatial direction.

It should be noted that, in the embodiments of the present disclosure, the planar flag information may be used to determine whether the occupied child-nodes of the current node constitute a plane in a corresponding spatial direction. In some embodiments, at an encoding side, an encoder may assign a value to the planar flag information. For example, when a value of the planar flag information is a numerical value, it is considered that the occupied child-nodes of the current node constitute a plane in a corresponding spatial direction. When a value of the planar flag information is another numerical value, it is considered that the occupied child-nodes of the current node do not constitute a plane in the corresponding spatial direction, that is, the plane constituted by the occupied child-node of the current node is perpendicular to this spatial direction.

In other words, in the embodiments of the present disclosure, when whether the occupied child-nodes of the current node constitute a plane in a spatial direction is determined, it may be determined through the planar flag information of this spatial direction. The planar flag information may be represented by a flag bit, occ_single_plane. An occ_single_plane[k] may be used to indicate whether the occupied child-nodes of the current node constitute a plane in a (k+1)-th spatial direction, and a value of k may be 0, 1, or 2.

Exemplarily, in the embodiments of the present disclosure, occ_single_plane[0] may characterize first planar flag information of the current node in the first spatial direction, occ_single_plane[1] may characterize second planar flag information of the current node in the second spatial direction, and occ_single_plane[2] may characterize the third planar flag information of the current node in the third spatial direction.

It can be understood that, in the embodiments of the present disclosure, a value of the planar flag information occ_single_plane[k] may be 0 or 1.

Correspondingly, in the embodiments of the present disclosure, in a case where determined planar flag information is a flag bit, occ_single_plane[k], when a value of the flag bit, occ_single_plane[k], is 0, it may be determined that the planar flag information indicates that the occupied child-nodes of the current node do not constitute a plane in the (k+1)-th spatial direction; and when a value of the flag bit, occ_single_plane[k], is 1, it may be determined that the planar flag information indicates that the occupied child-nodes of the current node constitute a plane in the (k+1)-th spatial direction.

In step 202: in a case where the three pieces of planar flag information indicate that the occupied child-nodes of the current node constitute planes in all of the three preset spatial directions, the all planar flag information of the current node is set to indicate that the occupied child-nodes of the current node constitute planes in all of the three preset spatial directions, and the all planar flag information is written into a bitstream.

In step 203: in a case where the three pieces of planar flag information indicate that the occupied child-nodes of the current node do not all constitute planes in the three preset spatial directions, the all planar flag information of the current node is set to indicate that the occupied child-nodes of the current node do not all constitute planes in the three preset spatial directions, and the all planar flag information is written into a bitstream.

In the embodiments of the present disclosure, after the three pieces of planar flag information of the current node in the three preset spatial directions are determined, in a case where the three pieces of planar flag information indicate that the occupied child-nodes of the current node constitute planes in all of the three preset spatial directions, the all planar flag information of the current node may be set to indicate that the occupied child-nodes of the current node constitute planes in all of the three preset spatial directions, and then the all planar flag information is written into the bitstream. Correspondingly, in a case where the three pieces of planar flag information indicate that the occupied child-nodes of the current node do not all constitute planes in the three preset spatial directions, the all planar flag information of the current node may be set to indicate that the occupied child-nodes of the current node do not all constitute planes in the three preset spatial directions, and then the all planar flag information is written into the bitstream (e.g., Signal all_planar_flag in a bitstream, where a flag bit, all_planar_flag, is used to characterize the all planar flag information).

Further, in the embodiments of the present disclosure, after the all planar flag information of the current node is determined, the encoder may write the all planar flag information into the bitstream. Herein, the all planar flag information may indicate whether the occupied child-nodes of the current node constitute planes in all of the three preset spatial directions. That is, through the all planar flag information corresponding to the current node, it may be determined whether the plane constituted by the occupied child-nodes of the current node is perpendicular to each of the three preset spatial directions.

It can be understood that, in the embodiments of the present disclosure, in a case where the occupied child-nodes of the current node do not constitute a plane in a spatial direction of the three preset spatial directions, it may be considered that the plane constituted by the occupied child-nodes of the current node is perpendicular to this spatial direction.

It should be noted that, in the embodiments of the present disclosure, the all planar flag information may be used to determine whether the occupied child-nodes of the current node constitute planes in all of the three preset spatial directions. In some embodiments, at an encoding side, an encoder may assign a value to the all planar flag information. For example, when a value of the all planar flag information is a numerical value, it is considered that the occupied child-nodes of the current node constitute planes in all of the three preset spatial directions; and when a value of the all planar flag information is another numerical value, it is considered that the occupied child-nodes of the current node do not all constitute planes in the three preset spatial directions.

In other words, in the embodiments of the present disclosure, when whether the occupied child-nodes of the current node constitute planes in all of the three preset spatial directions is determined, it may be determined through the all planar flag information. The all-planar flag information may be represented by a flag bit, all_planar_flag, or by another flag bit, all_planar_flagnot_all_planar_flag. Correspondingly, a standard text corresponding to writing the all planar flag information into the bitstream may be Signal all_planar_flag in a bitstream or may be Signal all_planar_flagnot_all_planar_flag in a bitstream, which is not limited specifically in the present disclosure.

It can be understood that, in the embodiments of the present disclosure, a value of the all planar flag information may be 0 or 1.

Correspondingly, in the embodiments of the present disclosure, in a case where determined all planar flag information is a flag bit, all_planar_flag, when a value of the flag bit, all_planar_flag, is 0, it may be determined that the all planar flag information indicates that the occupied child-nodes of the current node do not all constitute planes in the three preset spatial directions; and when a value of the flag bit, all_planar_flag is 1, it may be determined that the all planar flag information indicates that the occupied child-nodes of the current node constitute planes in all of the three preset spatial directions.

Correspondingly, in the embodiments of the present disclosure, in a case where determined all planar flag information is a flag bit, all_planar_flagnot_all_planar_flag, when a value of the flag bit, all_planar_flagnot_all_planar_flag, is 1, it may be determined that the all planar flag information indicates that the occupied child-nodes of the current node do not all constitute planes in the three preset spatial directions; and when a value of the flag bit, all_planar_flag, is 0, it may be determined that the all planar flag information indicates that the occupied child-nodes of the current node constitute planes in all of the three preset spatial directions.

Further, in the embodiments of the present disclosure, before the all planar flag information is acquired, whether the current node meets a plane qualification determination condition in the three preset spatial directions may be determined first, respectively. In a case where the current node meets the plane qualification determination condition in all of the three preset spatial directions, a process for determining the all planar flag information is performed, and then the all planar flag information is written into the bitstream.

Correspondingly, in the embodiments of the present disclosure, after whether the current node meets the plane qualification determination condition in the three preset spatial directions is determined, respectively, in a case where the current node does not meet the plane qualification determination condition in all of the three preset spatial directions, the process of determining the all planar flag information will no longer be performed. Instead, for one or two spatial directions that meet the plane qualification determination condition, the planar flag information of the current node in the one or two spatial directions that meet the plane qualification determination condition will be selected and determined; and then, an encoding processing may be performed according to the planar flag information of the current node in the one or two spatial directions.

In other words, in the embodiments of the present disclosure, a prerequisite for determining the all planar flag information of the current node and writing the all planar flag information into the bitstream is whether the current node meets the plane qualification determination condition in the three preset spatial directions.

Further, in the embodiments of the present disclosure, after the all planar flag information of the current node is determined, in a case where the all planar flag information indicates that the occupied child-nodes of the current node constitute planes in all of the three preset spatial directions, three pieces of plane position information of the current node in the three preset spatial directions are determined, and then the three pieces of plane position information may be written into the bitstream (e.g., Signal plane_position[k] in a bitstream, where the flag bit, plane_position[k], is used to characterize the plane position information in the (k+1)-th spatial direction, and a value of k may be 0, 1, 2).

It should be noted that, in the embodiments of the present disclosure, in a case where the all planar flag information indicates that the occupied child-nodes of the current node constitute planes in all of the three preset spatial directions, it may be stated that a position of the occupied child-nodes of the current node constitute planes in all of the three preset spatial directions, that is, the current node is determined to be a three-plane node, and therefore it may be considered that the occupied child-nodes of the current node may constitute a plane in any one preset spatial direction.

It can be understood that, in the embodiments of the present disclosure, for one spatial direction of the three preset spatial directions, in a case where it has been determined that the occupied child-nodes of the current node may constitute a plane in this preset spatial direction, it may directly default that the planar flag information of the current node in this spatial direction indicates that the occupied child-nodes of the current node constitute a plane in this spatial direction. Therefore, there is no need to encode the planar flag information of the current node in this spatial direction, but the three pieces of plane position information of the current node in the three preset spatial directions continue to be determined, and then the three pieces of plane position information are written into the bitstream.

Further, in the embodiments of the present disclosure, in a case where the all planar flag information indicates that the occupied child-nodes of the current node constitute planes in all of the three preset spatial directions, the encoding processing for the three pieces of planar flag information of the current node in the three preset spatial directions may be skipped, that is, the three pieces of planar flag information of the current node in the three preset spatial directions are not written into the bitstream.

It should be noted that, in the embodiments of the present disclosure, in a case where the planar flag information of the current node in a spatial direction indicates that the occupied child-nodes of the current node constitute a plane in this spatial direction, the plane position information of the current node in this spatial direction may be further determined; and in a case where the planar flag information of the current node in a spatial direction indicates that the occupied child-nodes of the current node do not constitute a plane in this spatial direction, it may be determined that the current node does not have the plane position information in this spatial direction.

It can be understood that in a case where a value of all_planar_flag is 1, it may be determined that the current node constitutes planes in all of the three preset spatial directions. At this time, at an encoding side, the three pieces of planar flag information in the three preset spatial directions are not written into the bitstream, that is, the bitstream does not contain the three pieces of planar flag information of the current node in the three preset spatial directions. Therefore, at a decoding side, the three pieces of planar flag information of the current node in the three preset spatial directions may be directly set to indicate that the occupied child-nodes of the current node constitute planes in all of the three preset spatial directions. That is, a value of the first planar flag information, occ_single_plane[0] in the first spatial direction, is set to 1, a value of the second planar flag information, occ_single_plane[1] in the second spatial direction, is set to 1, and a value of the third planar flag information, occ_single_plane[2] in the third spatial direction, is set to 1.

Further, in the embodiments of the present disclosure, after the all planar flag information of the current node is determined, in a case where the all planar flag information indicates that the occupied child-nodes of the current node do not all constitute planes in the three preset spatial directions, the encoding processing may be further performed according to the first planar flag information of the current node in the first spatial direction and the second planar flag information of the current node in the second spatial direction.

It should be noted that, in the embodiments of the present disclosure, the first spatial direction and the second spatial direction are any two different directions in the three preset spatial directions. Assuming that the three preset spatial directions may be an x-axis direction, a y-axis direction and a z-axis direction respectively, the first spatial direction and the second spatial direction may be any two directions in the x-axis direction, the y-axis direction and the z-axis direction. For example, the first spatial direction may be the x-axis direction, and the second spatial direction may be the y-axis direction; or, the first spatial direction may be the z-axis direction, and the second spatial direction may be the y-axis direction; or, the first spatial direction may be the z-axis direction, and the second spatial direction may be the x-axis direction, etc., which is not limited specifically in the embodiments of the present disclosure.

Further, in the embodiments of the present disclosure, in a case where the all planar flag information indicates that the occupied child-nodes of the current node do not all constitute planes in the three preset spatial directions, it may be considered that for at least one spatial direction of the three preset spatial directions, the occupied child-nodes of the current node do not constitute a plane in the at least one spatial direction.

It can be understood that in the embodiments of the present disclosure, a case where the all planar flag information indicates a possible occurrence in which the occupied child-nodes of the current node do not all constitute planes in the three preset spatial directions, may include that: 1. the occupied child-nodes of the current node do not constitute planes in two spatial directions, but only constitute a plane in the remaining spatial direction; 2. the occupied child-nodes of the current node constitute planes in two spatial directions, but do not constitute a plane in the remaining spatial direction.

It should be noted that, in the embodiments of the present disclosure, in a case where the first planar flag information indicates that the occupied child-nodes of the current node do not constitute a plane in the first spatial direction, it may be determined that the planar flag information indicates that the plane constituted by the occupied child-nodes of the current node is perpendicular to the first spatial direction: in a case where the second planar flag information indicates that the occupied child-nodes of the current node do not constitute a plane in the second spatial direction, it may be determined that the second planar flag information indicates the plane constituted by the occupied child-nodes of the current node is perpendicular to the second spatial direction; and in a case where the third planar flag information indicates that the occupied child-nodes of the current node do not constitute a plane in the third spatial direction, it may be determined that the third planar flag information indicates that the plane constituted by the occupied child-nodes of the current node is perpendicular to the third spatial direction.

In other words, in the embodiments of the present disclosure, in a case where the planar flag information in a spatial direction indicates that the occupied child-nodes of the current node do not constitute a plane in this spatial direction, it may be considered that the planar flag information in this spatial direction indicates that the plane constituted by the occupied child-nodes of the current node is perpendicular to this spatial direction. For example, in a case where the planar flag information in the x-axis direction indicates that the occupied child-nodes of the current node do not constitute a plane in the x-axis direction, it may be considered that the planar flag information in the x-axis direction indicates the plane constituted by the occupied child-nodes of the current node is perpendicular to the x-axis direction.

Further, in the embodiments of the present disclosure, in a case where the all planar flag information indicates that the occupied child-nodes of the current node do not all constitute planes in the three preset spatial directions, the first planar flag information of the current node in the first spatial direction and the second planar flag information of the current node in the second spatial direction may be determined first, and then it may be further determined according to the first planar flag information and the second planar flag information whether it is necessary to decode the third planar flag information of the current node in the third spatial direction.

Further, in the embodiments of the present disclosure, when the encoding processing is performed according to the first planar flag information and the second planar flag information, in a case where the first planar flag information indicates that the occupied child-nodes of the current node constitute a plane in the first spatial direction, and at the same time, the second planar flag information indicates that the occupied child-nodes of the current node constitute a plane in the second spatial direction, first plane position information of the current node in the first spatial direction and second plane position information of the current node in the second spatial direction may be further determined; and then the encoding processing may be performed based on the first plane position information and the second plane position information. That is, after the first planar flag information is written into the bitstream (e.g., Signal occ_single_plane[0] in a bitstream, where a flag bit, occ_single_plane[0], is used to characterize the first planar flag information), the first plane position information is written into the bitstream (e.g., Signal plane_position [0] in a bitstream, where the flag bit plane_position [0] is used to characterize the first plane position information); and after the second planar flag information is written into the bitstream (e.g., Signal occ_single_plane[1] in a bitstream, where a flag bit, occ_single_plane[1], is used to characterize the second planar flag information), the second plane position information is written into the bitstream (e.g., Signal plane_position [1] in a bitstream, where a flag bit, plane_position [1], is used to characterize the second plane position information).

It can be understood that, in the embodiments of the present disclosure, in a case where a value of occ_single_plane[0] is 1, it may be determined that the first planar flag information indicates that the occupied child-nodes of the current node constitute a plane in the first spatial direction, and in a case where a value of occ_single_plane[1] is 1, it may be determined that the second planar flag information indicates that the occupied child-nodes of the current node constitute a plane in the second spatial direction.

It should be noted that, in the embodiments of the present disclosure, after it is determined that the all planar flag information indicates that the occupied child-nodes of the current node do not all constitute planes in the three preset spatial directions, in a case where the first planar flag information and the second planar flag information indicate that the occupied child-nodes of the current node constitute planes in both the first spatial direction and the second spatial direction, it may be directly defaulted that the third planar flag information of the current node in the third spatial direction indicates that the occupied child-nodes of the current node do not constitute a plane in the third spatial direction, that is, it is directly defaulted that the planar flag information in the third spatial direction indicates that the plane constituted by the occupied child-nodes of the current node is perpendicular to the third spatial direction. Therefore, there is no need to perform encoding processing on the third planar flag information of the current node in the third spatial direction, that is, the third planar flag information of the current node in the third spatial direction is not written into the bitstream, but the first plane position information of the current node in the first spatial direction and the second plane position information in the second spatial direction continue to be determined, and then the first plane position information may be written into the bitstream after the first planar flag information is written into the bitstream; and the second plane position information may be written into the bitstream after the second planar flag information is written into the bitstream.

It should be noted that, in the embodiments of the present disclosure, the third spatial direction may be a direction of the three preset spatial directions other than the first spatial direction and the second spatial direction. Assuming that the three preset spatial directions may be an x-axis direction, a y-axis direction and a z-axis direction respectively, in a case where the first spatial direction may be the x-axis direction and the second spatial direction may be the y-axis direction, the third spatial direction may be the z-axis; and in a case where the first spatial direction may be the z-axis direction and the second spatial direction may be the y-axis direction, the third spatial direction may be the x-axis, which is not limited specifically in the embodiments of the present disclosure.

In other words, in the embodiments of the present disclosure, in a case where the all planar flag information indicates that the occupied child-nodes of the current node do not all constitute planes in the three preset spatial directions, if the first planar flag information and the second planar flag information indicate that the occupied child-nodes of the current node constitute planes in both the first spatial direction and the second spatial direction, and at this time, at an encoding side, the third planar flag information is not written into the bitstream, that is, there is no third planar flag information in the bitstream. Therefore, at a decoding side, decoding processing may not be performed on the third planar flag information, but the third planar flag information may be selected to directly set to indicate that the occupied child-nodes of the current node do not constitute a plane in the third spatial direction, that is, the planar flag information in the third spatial direction may be selected to directly set to indicate that the plane constituted by the occupied child-nodes of the current node is perpendicular to the third spatial direction.

It can be seen that in the embodiments of the present disclosure, in a case where a value of all_planar_flag is 0, if a value of occ_single_plane[0] is 1 and a value of occ_single_plane[1] is also 1, the encoding processing of occ_single_plane[2] may be directly skipped.

Further, in the embodiments of the present disclosure, when the encoding processing is performed according to the first planar flag information and the second planar flag information, in a case where the first planar flag information indicates that the occupied child-nodes of the current node do not constitute a plane in the first spatial direction, and/or the second planar flag information indicates that the occupied child-nodes of the current node do not constitute a plane in the second spatial direction, third planar flag information of the current node in the third spatial direction may be determined; and then the encoding processing may be performed based on the third planar flag information.

It can be understood that, in the embodiments of the present disclosure, in a case where a value of occ_single_plane[0] is 0, it may be determined that the first planar flag information indicates that the occupied child-nodes of the current node do not constitute a plane in the first spatial direction, and in a case where a value of occ_single_plane[1] is 0, it may be determined that the second planar flag information indicates that the occupied child-nodes of the current node do not constitute a plane in the second spatial direction. The third spatial direction may be a direction of the three preset spatial directions other than the first spatial direction and the second spatial direction.

It should be noted that, in the embodiments of the present disclosure, after it is determined that the all planar flag information indicates that the occupied child-nodes of the current node do not all constitute planes in the three preset spatial directions, in a case where the first planar flag information and/or the second planar flag information indicates that the occupied child-nodes of the current node do not constitute a plane in the first spatial direction and/or the second spatial direction, i.e., indicating that the occupied child-nodes of the current node do not constitute a plane in one or two spatial directions of the first spatial direction and the second spatial direction, it is necessary to further determine the third planar flag information of the current node in the third spatial direction, and then whether the occupied child-nodes of the current node constitute a plane in the third spatial direction is determined.

In other words, in the embodiments of the present disclosure, in a case where a value of all_planar_flag is 0, if a value of occ_single_plane[0] is 0, and/or a value of occ_single_plane[1] is 0, that is, a value of occ_single_plane[0] and a value of occ_single_plane[1] are not both 1, occ_single_plane[2] needs to be further determined.

Exemplarily, a possible implementation is that: in a case where the first planar flag information indicates that the occupied child-nodes of the current node constitute a plane in the first spatial direction, and the second planar flag information indicates that the occupied child-nodes of the current node do not constitute a plane in the second spatial direction, and the third planar flag information indicates that the occupied child-nodes of the current node do not constitute a plane in the third spatial direction, first plane position information of the current node in a first spatial direction may be further determined; and then the encoding processing may be performed based on the first plane position information, that is, the first plane position information is written into the bitstream after the first planar flag information is written into the bitstream.

In other words, in the embodiments of the present disclosure, in a case where a value of all_planar_flag is 0, if a value of occ_single_plane[0] is 1, a value of occ_single_plane[1] is 0, and a value of occ_single_plane[2] is 0, the first plane position information needs to be written into the bitstream after the first planar flag information is written into the bitstream.

Exemplarily, a possible implementation is that: in a case where the first planar flag information indicates that the occupied child-nodes of the current node constitute a plane in the first spatial direction, the second planar flag information indicates that the occupied child-nodes of the current node do not constitute a plane in the second spatial direction, and the third planar flag information indicates that the occupied child-nodes of the current node constitute a plane in the third spatial direction, first plane position information of the current node in a first spatial direction and third plane position information of the current node in a third spatial direction may be further determined; and then the encoding processing may be performed based on the first plane position information and the third plane position information, that is, the first plane position information is written into the bitstream after the first planar flag information is written into the bitstream, and the third plane position information is written into the bitstream after the third planar flag information is written into the bitstream.

In other words, in the embodiments of the present disclosure, in a case where a value of all_planar_flag is 0, if a value of occ_single_plane[0] is 1, a value of occ_single_plane[1] is 0, and a value of occ_single_plane[2] is 1, it is necessary to write the first plane position information into the bitstream after the first planar flag information is written into the bitstream, and the third plane position information is written into the bitstream (e.g., Signal occ_single_plane [2] in a bitstream, where a flag bit, occ_single_plane[2], is used to characterize the third planar flag information) after the third plane position information is written into the bitstream (e.g., Signal plane_position [2] in a bitstream, where the flag bit plane_position [2] is used to characterize the third plane position information).

Exemplarily, a possible implementation is that: in a case where the first planar flag information indicates that the occupied child-nodes of the current node do not constitute a plane in the first spatial direction, the second planar flag information indicates that the occupied child-nodes of the current node constitute a plane in the second spatial direction, and the third planar flag information indicates that the occupied child-nodes of the current node do not constitute a plane in the third spatial direction, second plane position information of the current node in a second spatial direction may be further determined; and then the encoding processing may be performed based on the second plane position information, that is, the second plane position information is written into the bitstream after the second planar flag information is written into the bitstream.

In other words, in the embodiments of the present disclosure, in a case where a value of all_planar_flag is 0, if a value of occ_single_plane[0] is 0, a value of occ_single_plane[1] is 1, and a value of occ_single_plane[2] is 0, the second plane position information needs to be written into the bitstream after the second planar flag information is written into the bitstream.

Exemplarily, a possible implementation is that: in a case where the first planar flag information indicates that the occupied child-nodes of the current node do not constitute a plane in the first spatial direction, the second planar flag information indicates that the occupied child-nodes of the current node constitute a plane in the second spatial direction, and the third planar flag information indicates that the occupied child-nodes of the current node constitute a plane in the third spatial direction, second plane position information of the current node in a second spatial direction and third plane position information of the current node in a third spatial direction may be further determined; and then the encoding processing may be performed based on the second plane position information and the third plane position information, that is, the second plane position information is written into the bitstream after the second planar flag information is written into the bitstream, and the third plane position information is written into the bitstream after the third planar flag information is written into the bitstream.

In other words, in the embodiments of the present disclosure, in a case where a value of all_planar_flag is 0, if a value of occ_single_plane[0] is 0, a value of occ_single_plane[1] is 1, and a value of occ_single_plane[2] is 1, it is necessary to write the second plane position information into the bitstream after the second planar flag information is written into the bitstream, and then, the third plane position information is written into the bitstream after the third planar flag information is written into the bitstream.

Exemplarily, a possible implementation is that: in a case where the first planar flag information indicates that the occupied child-nodes of the current node do not constitute a plane in the first spatial direction, the second planar flag information indicates that the occupied child-nodes of the current node do not constitute a plane in the second spatial direction, and the third planar flag information indicates that the occupied child-nodes of the current node constitute a plane in the third spatial direction, third plane position information of the current node in a third spatial direction may be further determined; and then the encoding processing may be performed based on the third plane position information, that is, the third plane position information is written into the bitstream after the third planar flag information is written into the bitstream.

In other words, in the embodiment of the present disclosure, in a case where a value of all_planar_flag is 0, if a value of occ_single_plane[0] is 0, the a of occ_single_plane[1] is 0, and a value of occ_single_plane[2] is 1, the third plane position information needs to be written into the bitstream after the third planar flag information is written into the bitstream.

It should be noted that, in the embodiments of the present disclosure, when the encoding processing is performed on the plane position information, in a case where the first planar flag information indicates that the occupied child-nodes of the current node constitute a plane in the first spatial direction, the first plane position information of the current node in the first spatial direction is encoded after the first planar flag information is encoded, otherwise, the encoding of the first plane position information is skipped after the first planar flag information is encoded: in a case where the second planar flag information indicates that the occupied child-nodes of the current node constitute a plane in the second spatial direction, the second plane position information of the current node in the second spatial direction is encoded after the second planar flag information is encoded, otherwise, the encoding of the second plane position information is skipped after the second planar flag information is encoded; and in a case where the third planar flag information indicates that the occupied child-nodes of the current node constitute a plane in the third spatial direction, the third plane position information of the current node in the third spatial direction is encoded after the third planar flag information is encoded, otherwise, the encoding of the third plane position information is skipped after the third planar flag information is encoded.

It can be understood that, in the embodiments of the present disclosure, for one spatial direction of the three preset spatial directions, the plane position information of the spatial direction may indicate the position of the plane constituted by the occupied child-nodes of the current node in this spatial direction, that is, the specific position of the plane constituted by the occupied child-nodes of the current node may be determined through the plane position information corresponding to the current node.

It should be noted that, in the embodiments of the present disclosure, the plane position information may be used to determine the position of the plane constituted by the occupied child-nodes of the current node in the corresponding spatial direction. In some embodiments, at an encoding side, an encoder may assign a value to the plane position information. For example, when a value of the plane position information is a numerical value, the position of the plane constituted by the occupied child-nodes of the current node in the corresponding spatial direction is considered to be a high plane; and when a value of the plane position information is another numerical value, the position of the plane formed by the occupied child-nodes of the current node in the corresponding spatial direction is considered to be a low plane.

In other words, in the embodiments of the present disclosure, when the position of the plane constituted by the occupied child-nodes of the current node in a spatial direction is determined, it may be determined through the plane position information in the spatial direction. The plane position information may be represented by a flag bit, plane_position. A plane_position [k] may be used to indicate the position of the plane constituted by the occupied child-nodes of the current node in the (k+1)-th spatial direction, and a value of k may be 0, 1, or 2.

Exemplarily, in the embodiments of the present disclosure, plane_position [0] may characterize the first plane position information of the current node in the first spatial direction, plane_position [1] may characterize the second plane position information of the current node in the second spatial direction, and plane_position [2] may characterize the third plane position information of the current node in the third spatial direction.

It can be understood that, in the embodiments of the present disclosure, a value of the plane position information, plane_position [k], may be 0 or 1.

Further, in the embodiments of the present disclosure, in a case where a value of the plane position information is a first value (e.g., 1), it may be determined that the plane position information indicates that the occupied child-nodes of the current node constitute a high plane in the corresponding spatial direction; and in a case where a value of the plane position information is a first value (e.g., 0), it may be determined that the plane position information indicates that the occupied child-nodes of the current node constitute a low plane in the corresponding spatial direction.

Correspondingly, in the embodiments of the present disclosure, in a case where determined plane position information is a flag bit, plane_position [k], when a value of the flag bit, plane_position[k], is 0, it may be determined that the plane position information indicates that the plane constituted by the occupied child-nodes of the current node in the (k+1)-th spatial direction is a low plane; and when a value of the flag bit plane_position[k] is 1, it may be determined that the plane position information indicates that the plane constituted by the occupied child-nodes of the current node in the (k+1)-th spatial direction is a high plane.

In summary, the point cloud encoding method proposed by the steps 201 to 203 mentioned above is a point cloud planar mode encoding method. A flag bit, all_planar_flag (i.e., all planar flag information) is introduced in the point cloud geometry planar encoding mode. Herein, when a value of all_planar_flag is 1, it represents that occupied child-nodes of a current node constitute planes in all of three preset spatial directions. At this time, values of three pieces of planar flag information, i.e., occ_single_plane[0], occ_single_plane[1] and occ_single_plane[2], may be directly inferred to be 1. Therefore, an encoding side may not write the three pieces of planar flag information into a bitstream, and at a decoding side, it may directly default that the three pieces of planar flag information of the current node in the three preset spatial directions respectively indicate that the occupied child-nodes of the current node constitute planes in all of the three preset spatial directions, or, the three pieces of planar flag information of the current node in the three preset spatial directions may be directly set to indicate that the occupied child-nodes of the current node constitute planes in the three preset spatial directions. When a value of all_planar_flag is 0, it represents that the occupied child-nodes of the current node do not constitute a plane in at least one spatial direction. At this time, two pieces of planar flag information of two spatial directions of the three preset spatial directions may be determined first. In a case where values of the two pieces of planar flag information are both 1, that is, the two pieces of planar flag information respectively indicate that the occupied child-nodes of the current node constitute planes in the two spatial directions, a value of the remaining planar flag information may be directly inferred to be 0. Therefore, the encoding side may not write the planar flag information in the third spatial direction into the bitstream, and at the decoding side, it may directly default that the flag information of the current node in the third spatial direction indicates that the occupied child-nodes of the current node constitute a plane in the third spatial direction, or, the planar flag information of the current node in the third spatial direction may be directly set to indicate that the occupied child-nodes of the current node constitute a plane in the third spatial direction. By encoding the planar flag in this way, a number of binary symbols required to transmit the planar flag bit, occ_single_plane[axisIdx], may be significantly reduced, thereby enhancing the planar mode geometry coding efficiency.

The embodiments of the present disclosure disclose a point cloud encoding method, where three pieces of planar flag information of a current node in three preset spatial directions are determined: in a case where the three pieces of planar flag information indicate that occupied child-nodes of a current node constitute planes in all of the three preset spatial directions, the all planar flag information of the current node is set to indicate that the occupied child-nodes of the current node constitute planes in all of the three preset spatial directions, and the all planar flag information is written into a bitstream; and in a case where the three pieces of planar flag information indicate that the occupied child-nodes of the current node do not all constitute planes in the three preset spatial directions, the all planar flag information of the current node is set to indicate that the occupied child-nodes of the current node do not all constitute planes in the three preset spatial directions, and the all planar flag information is written into the bitstream. It can be seen that, in the embodiments of the present disclosure, all planar flag information, all_planar_flag, is introduced. When a value of all_planar_flag is 1, it represents that the occupied child-nodes of the current node constitute planes in all of the three preset spatial directions, and at this time, there is no need to transmit the three pieces of planar flag information of the current node in the three preset spatial directions into the bitstream; and when a value of all_planar_flag is 0, it represents that the occupied child-nodes of the current node do not constitute a plane in at least one spatial direction, and at this time, two pieces of planar flag information of two spatial directions of the three preset spatial directions may be determined first. In a case where the two pieces of planar flag information respectively indicate that the occupied child-nodes of the current node constitute planes in the two spatial directions, there is no need to transmit the remaining planar flag information in the bitstream. It can be seen that the point cloud coding method proposed in the embodiments of the present disclosure may reduce complexity, enhance decoding efficiency, and improve video compression performance.

Based on the embodiments mentioned above, yet another embodiment of the present disclosure proposes a point cloud encoding method and a point cloud decoding method. At an encoding side, in a case where a current node meets a plane qualification determination condition in three directions (three preset spatial directions, such as an x-axis direction, a y-axis direction and a z-axis direction), all_planar_flag (all planar flag information) may be encoded.

Exemplarily, in a case where all_planar_flag is 1, plane position information, plane_position [0], plane_position [1], and plane_position [2] in three directions, may be calculated based on occupancy information of occupied child-nodes of a current node, and the plane position information is encoded. In a case where all_planar_flag is 0, the planar flag information, occ_single_plane[0] and occ_single_plane[1] in two directions, may be encoded first, and occ_single_plane[2] may be inferred based on occ_single_plane[0] and occ_single_plane[1].

It can be understood that in a case where occ_single_plane[0] and occ_single_plane[1] are both 1, occ_single_plane[0] and occ_single_plane[1] may be encoded as true; the plane position information, plane_position [0] and plane_ position [1], are calculated based on the occupancy information of the occupied child-nodes of the current node; and the plane position information is encoded. In a case where occ_single_plane[0] and occ_single_plane[1] are not both 1, occ_single_plane[0], occ_single_plane[1] and occ_single_ plane[2] are encoded, respectively; and when occ_single_ plane[axisIdx] is 1, the plane position information plane_ position [axisIdx] is calculated and the plane position information is encoded, where 0≤axisIdx≤2.

In a case where the current node does not meet the plane qualification determination condition in three directions, respective planar flag bits, occ_single_plane[axisIdx], and plane positions, plane_position [axisIdx], are determined according to whether respective directions meet the plane qualification determination condition, and are encoded.

Correspondingly, at a decoding side, in a case where a current node meets the plane qualification determination condition in all the three directions, all_planar_flag is decoded.

Exemplarily, in a case where all_planar_flag is 1, at this time, occ_single_plane[0], occ_single_plane[1], and occ_single_plane[2] are directly inferred to be 1, or occ_single_plane[0], occ_single_plane[1], and occ_single_plane[2] may be set to 1; and then the plane position information plane_position [0], plane_position [1], and plane_position [2] are decoded from the bitstream. In a case where all_planar_flag is 0, at this time. occ_single_plane[0] and occ_single_plane[1] are decoded from the bitstream.

It can be understood that in a case where both occ_single_plane[0] and occ_single_plane[1] are 1, occ_single_plane[2] is directly inferred to be 0, or occ_single_plane[2] may be set to 0; and then the plane position information plane_position [0] and plane_position [1] may be decoded from the bitstream. In a case where occ_single_plane[0] and occ_single_plane[1] are not both 1, occ_single_plane[2] is decoded from the bitstream; and the plane position information plane_position [axisIdx] is decoded from the bitstream accordingly according to whether occ_single_plane [axisIdx] is 1, where 0≤axisIdx≤2.

In a case where a current node does not meet a plane qualification determination condition in all the three directions, respective planar flags occ_single_plane[axisIdx] and plane positions plane_position [axisIdx] are decoded from the bitstream according to whether respective directions meet the plane qualification determination condition.

Figure 8:
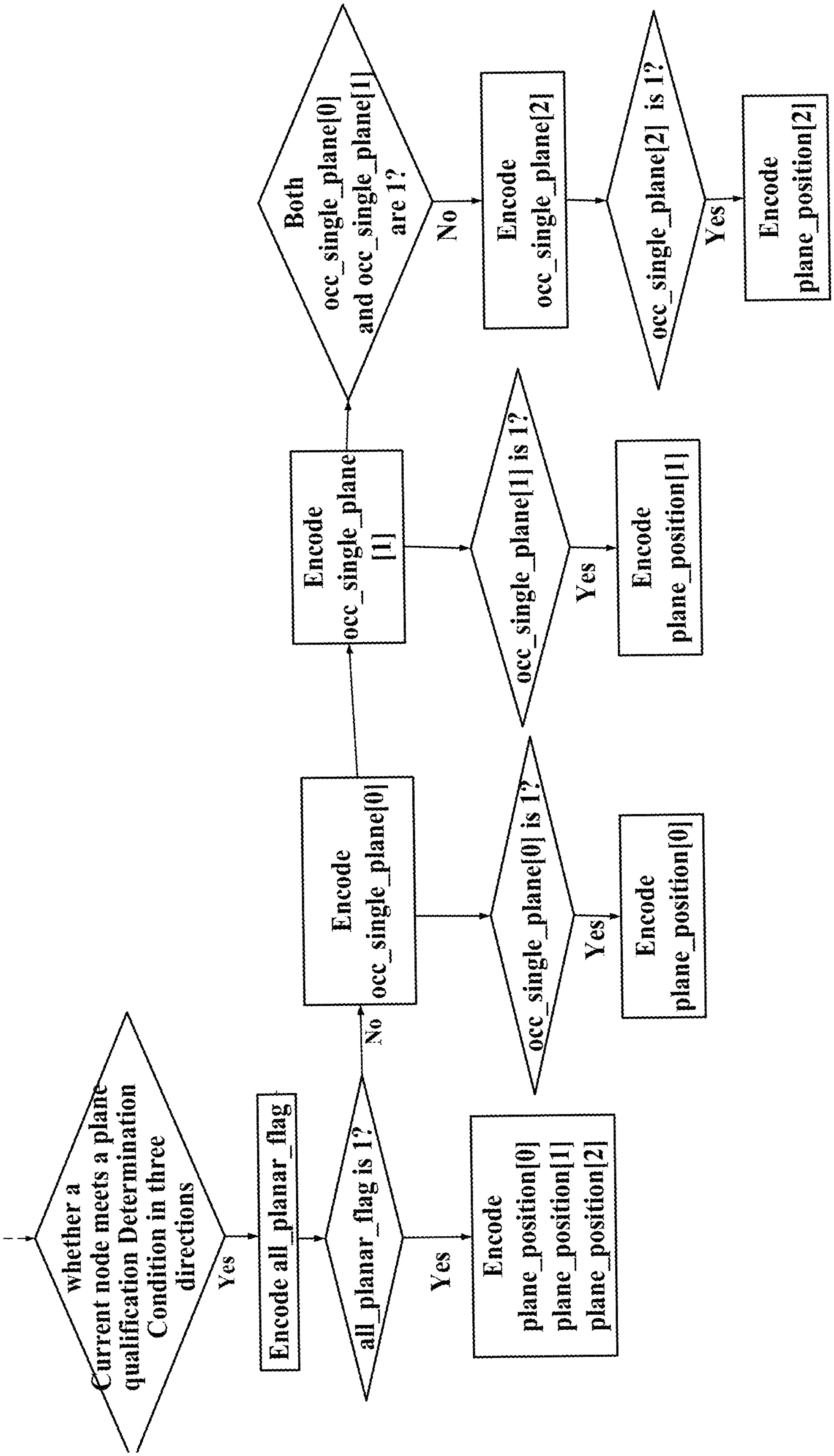
FIG. 8 is a schematic diagram of a point cloud encoding method proposed in the embodiments of the present disclosure.

Further, in the embodiments of the present disclosure, FIG. 8 is a schematic diagram of a point cloud encoding method proposed in the embodiments of the present disclosure. As shown in FIG. 8, after whether a current node meets a plane qualification determination condition in all the three directions is determined, in a case where the plane qualification determination condition is met in all the three directions, all_planar_flag may be encoded. It is determined whether all_planar_flag is 1. In a case where all_planar_flag is 1, it is determined that all planar flag information indicates that occupied child-nodes of a current node constitute planes in all of the three preset spatial directions. At this time, there is no need to encode occ_single_plane[0], occ_single_plane [1] and occ_single_plane[2], but the plane position information plane_position [0], plane_position [1] and plane_position [2] are directly encoded. In this case, three binary symbols for originally encoding occ_single_plane[0], occ_single_plane[1] and occ_single_plane[2], are represented by one binary symbol all_planar_flag.

Further, in a case where all_planar_flag is 0, the planar flag information occ_single_plane[0] and occ_single_plane [1] in two directions may be encoded first. It is determined whether occ_single_plane[0] is 1. In a case where occ_s-ingle_plane[0] is 1, the plane position information, plane_position [0] is encoded. Then, it is determined whether occ_single_plane[1] is 1. In a case where occ_single_plane [1] is 1, the plane position information plane_position [1] is encoded.

Further, occ_single_plane[2] may be inferred based on occ_single_plane[0] and occ_single_plane[1]. It may be first determined whether both occ_single_plane[0] and occ_single_plane[1] are 1. If so, that is, both occ_single_plane[0] and occ_single_plane[1] are 1, there is no need to encode occ_single_plane[2], this is because at this time occ_single_plane[2] must be 0. At this time, the plane position information plane_position [0] and plane_position [1] may be calculated based on occupancy information of occupied child-nodes of a current node, and the plane position information is encoded. If not, that is, occ_single_plane[0] and occ_single_plane[1] are not both 1, occ_single_plane[2] is encoded, and it is determined whether occ_single_plane[2] is 1. If so, that is, when occ_single_plane[2] is 1, the plane position information plane_position [2] is calculated, and the plane position information is encoded.

In a case where a current node does not meet a plane qualification determination condition in all the three directions, respective planar flags occ_single_plane[axisIdx], and plane position information, plane_position [axisIdx] are determined according to whether respective directions meet the plane qualification determination condition and are encoded.

Figure 9:
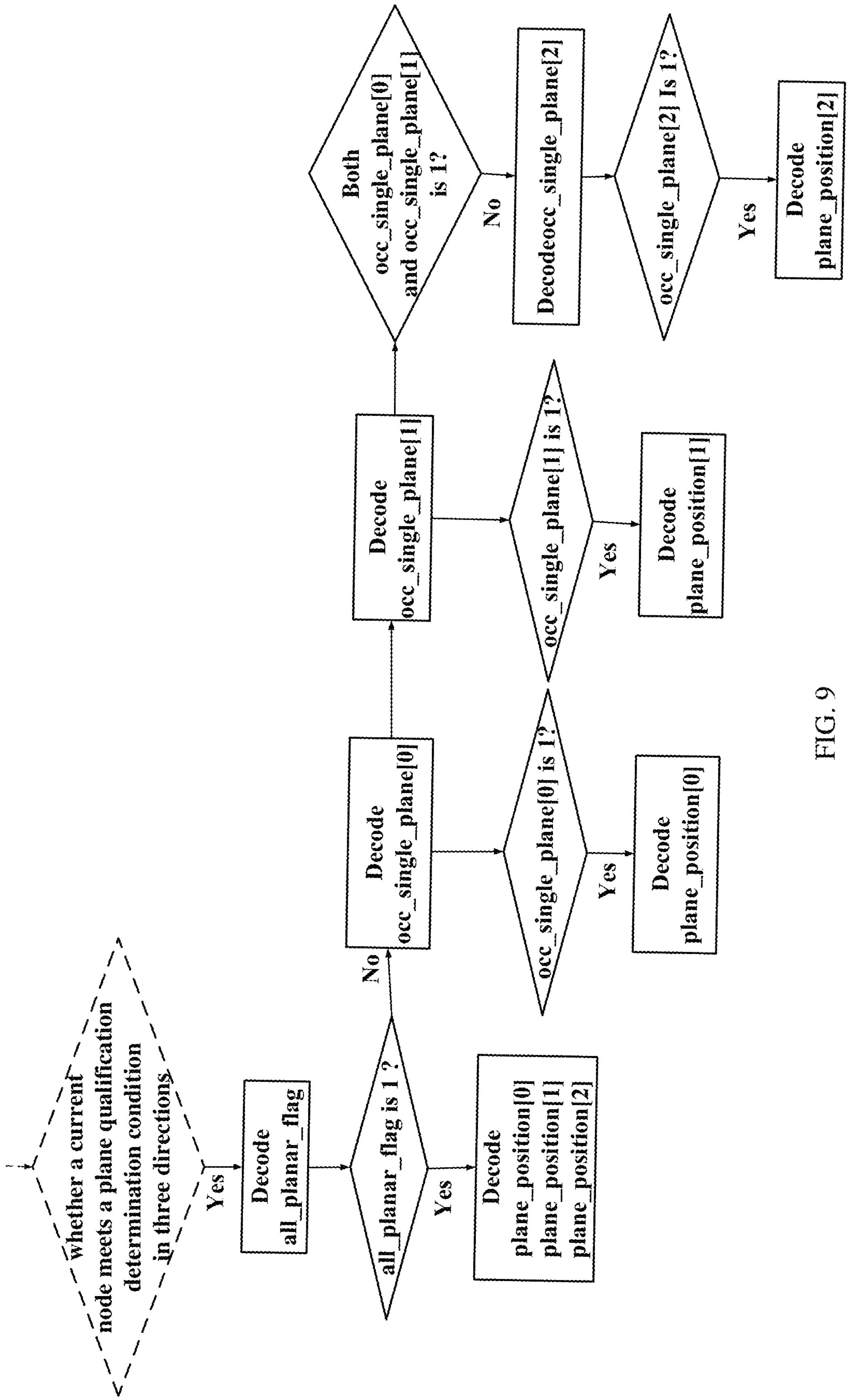
FIG. 9 is a schematic diagram of a point cloud decoding method proposed in the embodiments of the present disclosure.

Further, in the embodiments of the present disclosure, FIG. 9 is a schematic diagram of a point cloud decoding method proposed in the embodiments of the present disclosure. As shown in FIG. 9, after whether a current node meets a plane qualification determination condition in all the three directions is determined, in a case where the plane qualification determination condition is met in all the three directions, all_planar_flag may be decoded. It is determined whether all_planar_flag is 1. In a case where all_planar_flag is 1, it is determined that the all planar flag information indicates that the occupied child-nodes of the current node constitute planes in all of the three preset spatial directions, representing that the current node is a three-plane (i.e., positions of the occupied child-nodes of the current node constitute planes in all of the three directions). Therefore, three pieces of planar flag information occ_single_plane[0], occ_single_plane[1] and occ_single_plane[2] may be directly set to 1, and three pieces of plane position information plane_position [0], plane_position [1] and plane_position [2] may be decoded from the bitstream.

Further, in a case where all_planar_flag is 0, the planar flag information occ_single_plane[0] and occ_single_plane [1] in two directions, may be first decoded from the bitstream. It is determined whether occ_single_plane[0] is 1. In a case where occ_single_plane[0] is 1, the plane position information plane_position [0] is decoded. Then, it is determined whether occ_single_plane[1] is 1. In a case where occ_single_plane[1] is 1, the plane position information plane_position [1] is decoded.

Further, it may be determined whether both occ_single_plane[0] and occ_single_plane[1] are 1. If so, that is, both occ_single_plane[0] and occ_single_plane[1] are 1, there is no need to decode occ_single_plane[2], but occ_single_plane[2] is directly set to 0. If not, that is, occ_single_plane [0] and occ_single_plane[1] are not both 1, occ_single_plane[2] is decoded, and it is determined whether occ_single_plane[2] is 1. If so, that is, when occ_single_plane[2] is 1, the plane position information plane_position [2] is decoded from the bitstream accordingly.

In a case where a current node does not meet a plane qualification determination condition in all the three directions, a planar flag bit occ_single_plane[axisIdx], and plane position information plane_position [axisIdx], in respective directions are decoded from a bitstream according to whether the plane qualification determination condition is met in the respective directions.

In summary, in the point cloud encoding method and the point cloud decoding method proposed in the embodiments of the present disclosure, a flag bit all_planar_flag (i.e., all planar flag information) is introduced into a point cloud geometry planar encoding mode. When a value of all_planar_flag is 1, it represents that occupied child-nodes of a current node constitute planes in all of three preset spatial directions. At this time, values of three pieces of planar flag information occ_single_plane[0], occ_single_plane[1] and occ_single_plane[2] may be directly inferred to be 1, that is, it may be directly defaulted that the three pieces of planar flag information of the current node in the three preset spatial directions indicate respectively that the occupied child-nodes of the current node constitute planes in the three preset spatial directions, or it may be directly set that the three pieces of planar flag information of the current node in the three preset spatial directions indicate respectively that the occupied child-nodes of the current node constitute planes in the three preset spatial directions. When a value of all_planar_flag is 0, it represents that the occupied child-nodes of the current node do not constitute a plane in at least one spatial direction. At this time, two pieces of planar flag information of two spatial directions of the three preset spatial directions may be first decoded and determined. In a case where both values of the two pieces of planar flag information are 1, that is, the two pieces of planar flag information respectively indicate that the occupied child-nodes of the current node constitute planes in both the two spatial directions, a value of the remaining planar flag information may be directly inferred to be 0, that is, it may directly default that the flag information of the current node in the third spatial direction indicates that the occupied child-nodes of the current node constitute a plane in the third spatial direction, or, the planar flag information of the current node in the third spatial direction may be directly set to indicate that the occupied child-nodes of the current node constitute a plane in the third spatial direction. By coding a planar flag in this way, a number of binary symbols required to transmit the planar flag occ_single_plane[axisIdx] can be significantly reduced, thereby enhancing the planar mode geometry coding efficiency.

The embodiments of the present disclosure disclose a point cloud coding method, where a decoder decodes a bitstream and determines all planar flag information of a current node; in a case where the all planar flag information indicates that occupied child-nodes of a current node constitute planes in all of three preset spatial directions, a bitstream is decoded and three pieces of plane position information of the current node in the three preset spatial directions are determined, and reconstructed geometry information of the current node is determined based on the three pieces of plane position information; and in a case where the all planar flag information indicates that the occupied child-nodes of the current node do not all constitute planes in the three preset spatial directions, the bitstream is decoded and first planar flag information of the current node in a first spatial direction and second planar flag information of the current node in a second spatial direction are determined, and reconstructed geometry information of the current node is determined based on the first planar flag information and the second planar flag information. The first spatial direction and the second spatial direction are any two different directions in the three preset spatial directions. Three pieces of planar flag information of the current node in the three preset spatial directions are determined; in a case where the three pieces of planar flag information indicate that the occupied child-nodes of the current node constitute planes in all of the three preset spatial directions, the all planar flag information of the current node is set to indicate that the occupied child-nodes of the current node constitute planes in all of the three preset spatial directions, and the all planar flag information is written into the bitstream; and in a case where the three pieces of planar flag information indicate that the occupied child-nodes of the current node do not all constitute planes in the three preset spatial directions, the all planar flag information of the current node is set to indicate that the occupied child-nodes of the current node do not all constitute planes in the three preset spatial directions, and the all planar flag information is written into the bitstream. It can be seen that in the embodiments of the present disclosure, all planar flag information all_planar_flag is introduced. When a value of all_planar_flag is 1, it represents that the occupied child-nodes of the current node constitute planes in all of the three preset spatial directions. At this time, there is no need to transmit the three pieces of planar flag information of the current node in the three preset spatial directions in the bitstream. When a value of all_planar_flag is 0, it presents that the occupied child-nodes of the current node do not constitute a plane in at least one spatial direction. At this time, two pieces of planar flag information of two spatial directions of the three preset spatial directions may be determined first. In a case where the two pieces of planar flag information indicate respectively that the occupied child-nodes of the current node constitute planes in the two spatial directions, there is no need to transmit the remaining planar flag information in the bitstream. It can be seen that the point cloud coding method proposed in the embodiments of the present disclosure can reduce complexity, enhance decoding efficiency, and improve video compression performance.

Figure 10:
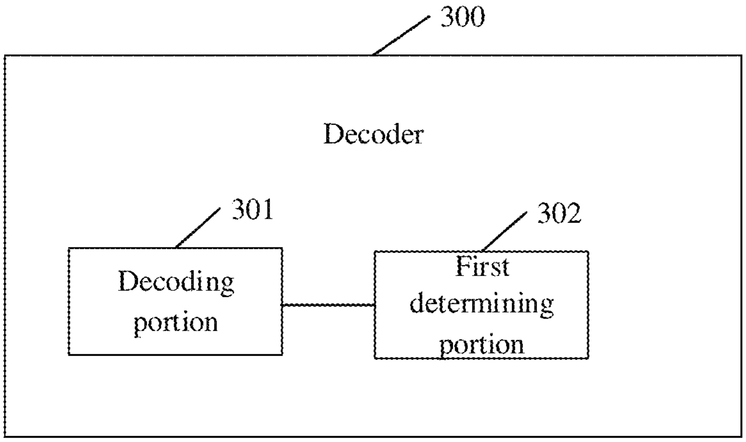
FIG. 10 is a first schematic structural diagram of a component of a decoder.

Based on the embodiments mentioned above, in yet another embodiment of the present disclosure, FIG. 10 is a first schematic structural diagram of a component of a decoder. As shown in FIG. 10, a decoder 300 proposed in the embodiments of the present disclosure may include: a decoding portion 301 and a first determining portion 302;

- the decoding portion 301 is configured to decode a bitstream;
- the first determining portion 302 is configured to determine all planar flag information of a current node;
- the decoding portion 301 is further configured to decode the bitstream in a case where the all planar flag information indicates that the occupied child-nodes of the current node constitute planes in all of three preset spatial directions;
- the first determining portion 302 is further configured to: determine three pieces of plane position information of the current node in the three preset spatial directions, and determine reconstructed geometry information of the current node based on the three pieces of plane position information;
- the decoding portion 301 is further configured to decode the bitstream in a case where the all planar flag information indicates that the occupied child-nodes of the current node do not all constitute planes in the three preset spatial directions;
- the first determining portion 302 is further configured to: determine first planar flag information of the current node in a first spatial direction and second planar flag information of the current node in a second spatial direction, and determine the reconstructed geometry information of the current node according to the first planar flag information and the second planar flag information; where the first spatial direction and the second spatial direction are any two different directions in the three preset spatial directions.

Figure 11:
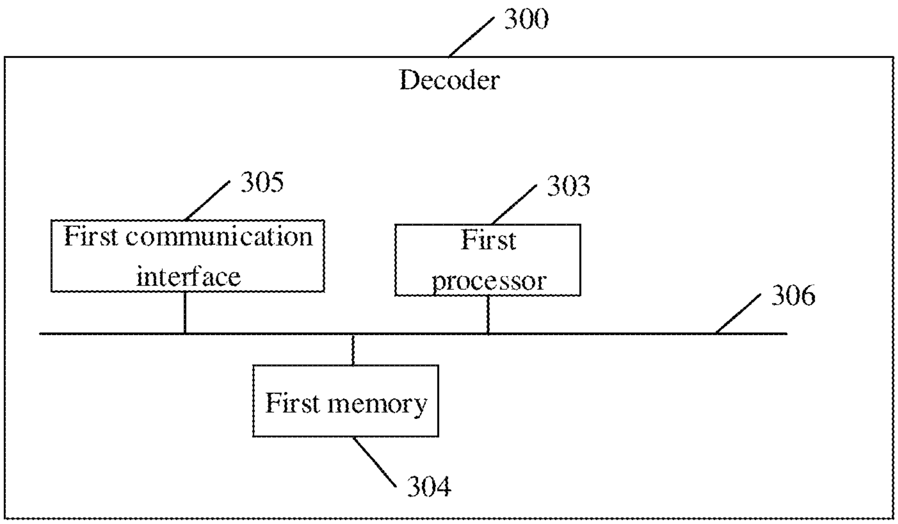
FIG. 11 is a second schematic structural diagram of a component of a decoder.

FIG. 11 is a second schematic structural diagram of a component of a decoder. As shown in FIG. 11, a decoder 300 proposed in the embodiments of the present disclosure may further include a first processor 303, a first memory 304 storing instructions executable by the first processor 303, a first communication interface 305, and a first bus 306 for connecting the first processor 303, the first memory 304 and the first communication interface 305.

Further, in the embodiments of the present disclosure, the first processor 303 mentioned above is used to: decode a bitstream and determine all planar flag information of a current node; in a case where the all planar flag information indicates that occupied child-nodes of the current node constitute planes in all of three preset spatial directions, decode the bitstream to determine three pieces of plane position information of the current node in the three preset spatial directions, and determine reconstructed geometry information of the current node based on the three pieces of plane position information; and in a case where the all planar flag information indicates that the occupied child-nodes of the current node do not all constitute planes in the three preset spatial directions, decode the bitstream to determine first planar flag information of the current node in a first spatial direction and second planar flag information of the current node in a second spatial direction, and determine reconstructed geometry information of the current node based on the first planar flag information and the second planar flag information; where the first spatial direction and the second spatial direction are any two different directions in the three preset spatial directions.

Figure 12:
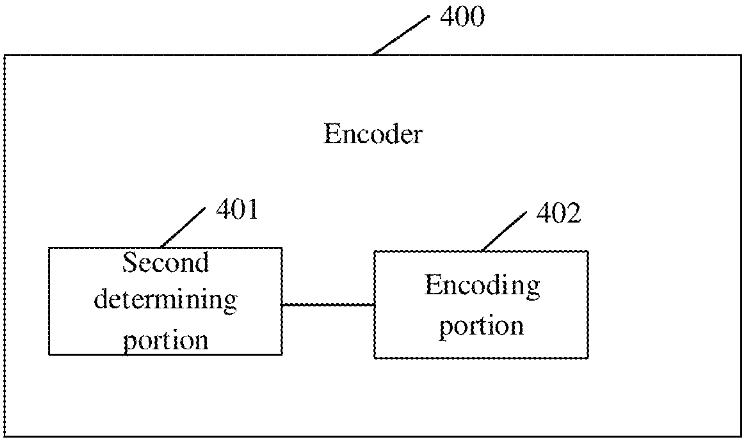
FIG. 12 is a first schematic structural diagram of a component of an encoder.

FIG. 12 is a first schematic structural diagram of a component of an encoder. As shown in FIG. 12, an encoder 400 proposed in the embodiments of the present disclosure may include: a second determining portion 401 and an encoding portion 402;

- the second determining portion 401 is configured to: determine three pieces of planar flag information of a current node in three preset spatial directions; in a case where the three pieces of planar flag information indicate that occupied child-nodes of the current node constitute planes in all of the three preset spatial directions, set all planar flag information of the current node to indicate that the occupied child-nodes of the current node constitute planes in all of the three preset spatial directions;
- the second determining portion 401 is further configured to: in a case where the three pieces of planar flag information indicate that the occupied child-nodes of the current node do not all constitute planes in the three preset spatial directions, set all planar flag information of the current node to indicate that the occupied child-nodes of the current node do not all constitute planes in the three preset spatial directions;
- the encoding portion 402 is configured to write the all planar flag information into a bitstream.

Figure 13:
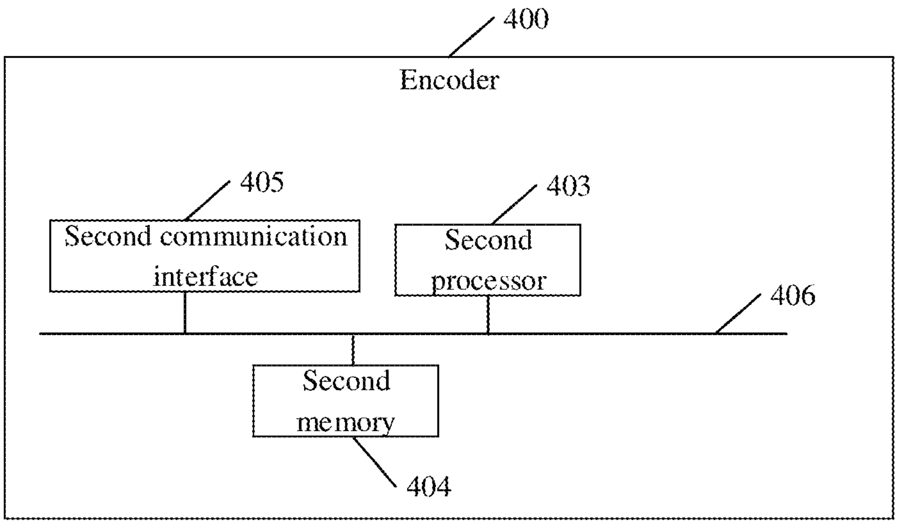
FIG. 13 is a second schematic structural diagram of a component of an encoder.

FIG. 13 is a second schematic structural diagram of a component of an encoder. As shown in FIG. 13, an encoder 400 proposed in the embodiments of the present disclosure may further include a second processor 403, a second memory 404 storing instructions executable by the second processor 403, a second communication interface 405, and a second bus 406 for connecting the second processor 403, the second memory 404 and the second communication interface 405.

Further, in the embodiments of the present disclosure, the second processor 403 mentioned above is used to: determine all planar flag information of a current node and write the all planar flag information into a bitstream; in a case where the all planar flag information indicates that occupied child-nodes of the current node constitute planes in all of three preset spatial directions, determine three pieces of plane position information of the current node in the three preset spatial directions, and write the three pieces of plane position information into the bitstream; and in a case where the all planar flag information indicates that occupied child-nodes of the current node do not all constitute planes in three preset spatial directions, determine first planar flag information of the current node in a first spatial direction and second planar flag information of the current node in a second spatial direction, and perform encoding processing according to the first planar flag information and the second planar flag information; where the first spatial direction and the second spatial direction are any two different directions in the three preset spatial directions.

It can be understood that, in the embodiments of the present disclosure, a "unit" may be a part of a circuit, a part of a processor, a part of a program or software, etc., and of course, may also be a module, or may also be non-modular. Moreover, respective components in the embodiments may be integrated into one processing unit, or respective units may exist physically separately, or two or more units may be integrated into one unit. The integrated unit mentioned above may be implemented in the form of hardware or in the form of a software function module.

In a case where the integrated unit is implemented in the form of a software function module and is not sold or used as an independent product, the integrated unit may be stored in a non-transitory computer-readable storage medium. Based on this understanding, the technical solutions of the embodiments are essentially or the part that contributes to the prior art or all or part of the technical solutions may be embodied in the form of a software product. The computer software product is stored in a storage medium and includes a number of instructions for enabling a computer device (which may be a personal computer, a server, or a network device, etc.) or a processor to perform all or part of the steps of the method described in the embodiments. The aforementioned storage medium includes various media that may store a program code, such as a U disk, a mobile hard disk, a read only memory (Read Only Memory, ROM), a random access memory (Random Access Memory, RAM), a diskette or a compact disc.

It can be understood that the memory in the embodiments of the present disclosure may be a volatile memory or a non-volatile memory, or may include both volatile and non-volatile memories. The non-volatile memory may be a Read-Only Memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory may be a Random Access Memory (Random Access Memory, RAM), which is used as an external cache. Through illustrative, rather than limiting, illustration, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM) and a direct Rambus random access memory (Direct Rambus RAM, DRRAM). It should be noted that, the memory of the system and the method described in the present disclosure is intended to include, but not limited to, these and any other suitable types of memories.

The processor may be an integrated circuit chip with a signal processing capability. In the implementation process, respective steps of the method mentioned above may be completed by an integrated logic circuit of hardware or an instruction in the form of software in the processor. The processor mentioned above may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or other programmable logic devices, discrete gates or transistor logic devices, and discrete hardware components, and may implement or perform various methods, steps and logic diagrams disclosed in the embodiments of the present disclosure. The general-purpose processor may be a microprocessor, or the processor may be any conventional processor, etc. The steps of the method disclosed in combination with the embodiments of the present disclosure may be directly implemented as completing execution by a hardware decoding processor, or may be implemented as completing execution by a combination of hardware and software modules in the decoding processor. The software module may be located in a mature storage medium in the art, such as a random access memory, a flash memory, a read-only memory, a programmable read-only memory, or an electrically erasable programmable memory, a register, etc. The storage medium is located in the memory, and the processor reads the information in the memory and completes the steps of the method mentioned above in combination with its hardware.

It can be understood that the embodiments described in the present disclosure may be implemented by hardware, software, firmware, middleware, microcode, or a combination thereof. For a hardware implementation, the processing unit may be implemented in one or more application specific integrated circuits (Application Specific Integrated Circuits, ASIC), digital signal processors (Digital Signal Processor, DSP), digital signal processing devices (DSP Device, DSPD), programmable logic devices (Programmable Logic Device, PLD), field programmable gate arrays (Field-Programmable Gate Array, FPGA), general-purpose processors, controllers, microcontrollers, microprocessors, other electronic units for performing the functions described in the present disclosure, or combinations thereof. For a software implementation, the technology described in the present disclosure may be implemented through modules (e.g., procedures, functions) that perform the functions described in the present disclosure. The software codes may be stored in a memory and executed by a processor. The memory may be implemented in the processor or external to the processor.

The embodiments of the present disclosure provide a codec, where a decoder decodes a bitstream and determines all planar flag information of a current node; in a case where the all planar flag information indicates that occupied child-nodes of the current node constitute planes in all of three preset spatial directions, the decoder decodes a bitstream to determine three pieces of plane position information of the current node in the three preset spatial directions, and determines reconstructed geometry information of the current node based on the three pieces of plane position information; and in a case where the all planar flag information indicates that occupied child-nodes of the current node do not all constitute planes in three preset spatial directions, the decoder decodes the bitstream to determine first planar flag information of the current node in a first spatial direction and second planar flag information of the current node in a second spatial direction, and determines reconstructed geometry information of the current node based on the first planar flag information and the second planar flag information, where the first spatial direction and the second spatial direction are any two different directions in the three preset spatial directions. An encoder determines three pieces of planar flag information of a current node in three preset spatial directions; in a case where the three pieces of planar flag information indicate that occupied child-nodes of the current node constitute planes in all of the three preset spatial directions, the all planar flag information of the current node is set to indicate that the occupied child-nodes of the current node constitute planes in all of the three preset spatial directions, and the all planar flag information is written into a bitstream; and in a case where the three pieces of planar flag information indicate that occupied child-nodes of the current node do not all constitute planes in the three preset spatial directions, the all planar flag information of the current node is set to indicate that the occupied child-nodes of the current node do not all constitute planes in the three preset spatial directions, and the all planar flag information is written into a bitstream. It can be seen that in the embodiments of the present disclosure, all planar flag information, all_planar_flag, is introduced. When a value of all_planar_flag is 1, it represents that the occupied child-nodes of the current node constitute planes in all of the three preset spatial directions. At this time, there is no need to transmit the three pieces of planar flag information of the current node in the three preset spatial directions in the bitstream. When a value of all_planar_flag is 0, it presents that the occupied child-nodes of the current node do not constitute a plane in at least one spatial direction. At this time, two pieces of planar flag information of two spatial directions of the three preset spatial directions may be determined first. In a case where the two pieces of planar flag information indicate respectively that the occupied child-nodes of the current node constitute planes in the two spatial directions, there is no need to transmit the remaining planar flag information in the bitstream. It can be seen that the point cloud coding method proposed in the embodiments of the present disclosure can reduce complexity, enhance decoding efficiency, and improve video compression performance.

The embodiments of the present disclosure provide a non-transitory computer storage medium applied to an encoder 300. The non-transitory computer storage medium stores a point cloud decoding program. When the point cloud decoding program is executed by a processor, the method described in any one of the aforementioned embodiments is implemented.

In some embodiments, program instructions corresponding to a point cloud decoding method in the embodiments may be stored on a storage medium such as a compact disc, a hard disk, a U disk, etc. When the program instructions corresponding to the point cloud decoding method in the storage medium are read or executed by an electronic device, the following steps are included:

- decoding a bitstream to determine all planar flag information of a current node;
- in a case where the all planar flag information indicates that occupied child-nodes of the current node constitute planes in all of three preset spatial directions, decoding the bitstream to determine three pieces of plane position information of the current node in the three preset spatial directions, and determining reconstructed geometry information of the current node based on the three pieces of plane position information; and
- in a case where the all planar flag information indicates that occupied child-nodes of the current node do not all constitute planes in three preset spatial directions, decoding the bitstream to determine first planar flag information of the current node in a first spatial direction and second planar flag information of the current node in a second spatial direction, and determining reconstructed geometry information of the current node based on the first planar flag information and the second planar flag information; where the first spatial direction and the second spatial direction are any two different directions in the three preset spatial directions.

The embodiments of the present disclosure provide a non-transitory computer storage medium applied to an encoder 400. The non-transitory computer storage medium stores a point cloud encoding program. When the point cloud encoding program is executed by a processor, the method described in any one of the aforementioned embodiments is implemented.

In some embodiments, the program instructions corresponding to the point cloud encoding method in the embodiments may be stored on a storage medium such as a compact disc, a hard disk, a U disc, etc. When the program instructions corresponding to the point cloud encoding method in the storage medium are read or executed by an electronic device, the following steps are included:

- determining all planar flag information of a current node, and writing the all planar flag information into a bitstream;
- in a case where the all planar flag information indicates that occupied child-nodes of the current node constitute planes in all of three preset spatial directions, determining three pieces of plane position information of the current node in the three preset spatial directions, and writing the three pieces of plane position information into the bitstream; and
- in a case the all planar flag information indicates that occupied child-nodes of the current node do not all constitute planes in three preset spatial directions, determining first planar flag information of the current node in a first spatial direction and second planar flag information of the current node in a second spatial direction, and performing encoding processing according to the first planar flag information and the second planar flag information; where the first spatial direction and the second spatial direction are any two different directions in the three preset spatial directions.

It should be noted that, in the embodiments of the present disclosure, the terms “comprise (include)”, “contain” or any other variations thereof are intended to cover non-exclusive inclusion, so that a process, method, article or apparatus including a series of elements includes not only those elements, but also includes other elements not explicitly listed, or also includes elements inherent to such process, method, article or apparatus. Without more constraints, an element defined by the phrase "comprise (include) a . . . " does not exclude the existence of other identical elements in the process, method, article or apparatus including the element.

The serial numbers of the embodiments of the present disclosure mentioned above are for description only and do not represent the advantages or disadvantages of the embodiments.

The methods disclosed in several method embodiments provided in the present disclosure may be arbitrarily combined without conflict to obtain new method embodiments.

The features disclosed in several product embodiments provided in the present disclosure may be arbitrarily combined without conflict to obtain new product embodiments.

The features disclosed in several method or device embodiments provided in the present disclosure may be arbitrarily combined without conflict to obtain new method embodiments or device embodiments.

The above is only an implementation of the present disclosure, but the protection scope of the present disclosure is not limited thereto. Any technician familiar with the technical art may easily conceive of changes or substitutions within the technical scope disclosed in the present disclosure, which should be covered in the protection scope of the present disclosure. Therefore, the protection scope of the present disclosure should be based on the protection scope of the claims.

INDUSTRIAL APPLICABILITY

The embodiments of the present disclosure disclose a point cloud coding method, a decoder, an encoder and a non-transitory computer storage medium. A decoder decodes a bitstream and determines all planar flag information of a current node; in a case where the all planar flag information indicates that occupied child-nodes of the current node constitute planes in all of three preset spatial directions, the decoder decodes a bitstream and determines three pieces of plane position information of the current node in the three preset spatial directions, and determines reconstructed geometry information of the current node based on the three pieces of plane position information; and in a case where the all planar flag information indicates that occupied child-nodes of the current node do not all constitute planes in three preset spatial directions, the decoder decodes the bitstream to determine first planar flag information of the current node in a first spatial direction and second planar flag information of the current node in a second spatial direction, and determines reconstructed geometry information of the current node based on the first planar flag information and the second planar flag information. The first spatial direction and the second spatial direction are any two different directions in the three preset spatial directions. Three pieces of planar flag information of a current node in three preset spatial directions is determined; in a case where the three pieces of planar flag information indicate that occupied child-nodes of the current node constitute planes in all of three preset spatial directions, the all planar flag information of the current node is set to indicate that the occupied child-nodes of the current node constitute planes in all of the three preset spatial directions, and the all planar flag information is written into a bitstream; and in a case where the three pieces of planar flag information indicate that occupied child-nodes of the current node do not all constitute planes in the three preset spatial directions, the all planar flag information of the current node is set to indicate that the occupied child-nodes of the current node do not all constitute planes in the three preset spatial directions, and the all planar flag information is written into a bitstream. It can be seen that in the embodiments of the present disclosure, all planar flag information, all_planar_flag, is introduced. When a value of all_planar_flag is 1, it represents that the occupied child-nodes of the current node constitute planes in all of the three preset spatial directions. At this time, there is no need to transmit the three pieces of planar flag information of the current node in the three preset spatial directions in the bitstream. When a value of all_planar_flag is 0, it represents that the occupied child-nodes of the current node do not constitute a plane in at least one spatial direction. At this time, two pieces of planar flag information of two spatial directions of the three preset spatial directions may be determined first. In a case where the two pieces of planar flag information indicate respectively that the occupied child-nodes of the current node constitute planes in the two spatial directions, there is no need to transmit the remaining planar flag information in the bitstream. It can be seen that the point cloud coding method proposed in the embodiments of the present disclosure may reduce complexity, enhance decoding efficiency, and improve video compression performance.

What is claimed is:

1. A point cloud decoding method, applied to a decoder and comprising:

decoding a bitstream, and determining all planar flag information of a current node;

in a case where the all planar flag information indicates that occupied child-nodes of the current node constitute planes in all of three preset spatial directions, decoding the bitstream to determine three pieces of plane position information of the current node in the three preset spatial directions, and determining reconstructed geometry information of the current node based on the three pieces of plane position information; and in a case where the all planar flag information indicates that occupied child-nodes of the current node do not all constitute planes in three preset spatial directions, decoding the bitstream to determine first planar flag information of the current node in a first spatial direction and second planar flag information of the current node in a second spatial direction, and determining reconstructed geometry information of the current node according to the first planar flag information and the second planar flag information;

wherein the method further comprises:

in a case where the first planar flag information indicates that the occupied child-nodes of the current node do not constitute a plane in the first spatial direction, and/or the second planar flag information indicates that the occupied child-nodes of the current node do not constitute a plane in the second spatial direction, decoding the bitstream to determine third planar flag information of the current node in a third spatial direction; wherein the third spatial direction is a direction of the three preset spatial directions other than the first spatial direction and the second spatial direction;

wherein the method further comprises:

in a case where the first planar flag information indicates that the occupied child-nodes of the current node constitute a plane in the first spatial direction, the second planar flag information indicates that the occupied child-nodes of the current node do not constitute a plane in the second spatial direction, and the third planar flag information indicates that the occupied child-nodes of the current node do not constitute a plane in the third spatial direction, determining first plane position information of the current node in the first spatial direction; and determining the reconstructed geometry information of the current node based on the first plane position information; and in a case where the first planar flag information indicates that the occupied child-nodes of the current node constitute a plane in the first spatial direction, the second planar flag information indicates that the occupied child-nodes of the current node do not constitute a plane in the second spatial direction, and the third planar flag information indicates that the occupied child-nodes of the current node constitute a plane in the third spatial direction, determining first plane position information of the current node in the first spatial direction and third plane position information of the current node in the third spatial direction; and determining the reconstructed geometry information of the current node based on the first plane position information and the third plane position information.

2. The method according to claim 1, wherein the method further comprises:

in a case where the all planar flag information indicates that the occupied child-nodes of the current node constitute planes in all of the three preset spatial directions, setting three pieces of planar flag information of the current node in the three preset spatial directions to indicate respectively that the occupied child-nodes of the current node constitute planes in the three preset spatial directions.

3. The method according to claim 1, wherein the method further comprises:

in a case where the first planar flag information indicates that the occupied child-nodes of the current node constitute a plane in the first spatial direction, and the second planar flag information indicates that the occupied child-nodes of the current node constitute a plane in the second spatial direction, decoding the bitstream to determine first plane position information of the current node in the first spatial direction and second plane position information of the current node in the second spatial direction; and determining the reconstructed geometry information of the current node based on the first plane position information and the second plane position information.

4. The method according to claim 3, wherein the method further comprises:

in a case where the first planar flag information indicates that the occupied child-nodes of the current node constitute a plane in the first spatial direction, and the second planar flag information indicates that the occupied child-nodes of the current node constitute a plane in the second spatial direction, setting third planar flag information of the current node in a third spatial direction to indicate that the occupied child-nodes of the current node do not constitute a plane in the third spatial direction.

5. The method according to claim 4, wherein the method further comprises:

in a case where the first planar flag information indicates that the occupied child-nodes of the current node constitute a plane in the first spatial direction, decoding the bitstream to determine first plane position information of the current node in the first spatial direction; and in a case where the first planar flag information indicates that the occupied child-nodes of the current node do not constitute a plane in the first spatial direction, skipping decoding of the first plane position information; and in a case where the second planar flag information indicates that the occupied child-nodes of the current node constitute a plane in the second spatial direction, decoding the bitstream to determine second plane position information of the current node in the second spatial direction; and in a case where the second planar flag information indicates that the occupied child-nodes of the current node do not constitute a plane in the second spatial direction, skipping decoding of the second plane position information; and in a case where the third planar flag information indicates that the occupied child-nodes of the current node constitute a plane in the third spatial direction, decoding the bitstream to determine third plane position information of the current node in the third spatial direction; and in a case where the third planar flag information indicates that the occupied child-nodes of the current node do not constitute a plane in the third spatial direction, skipping decoding of the third plane position information.

6. The method according to claim 1, wherein the method further comprises:

in a case where the first planar flag information indicates that the occupied child-nodes of the current node do not constitute a plane in the first spatial direction, the second planar flag information indicates that the occupied child-nodes of the current node constitute a plane in the second spatial direction, and the third planar flag information indicates that the occupied child-nodes of the current node do not constitute a plane in the third spatial direction, determining second plane position information of the current node in the second spatial direction; and determining the reconstructed geometry information of the current node based on the second plane position information; and in a case where the first planar flag information indicates that the occupied child-nodes of the current node do not constitute a plane in the first spatial direction, the second planar flag information indicates that the occupied child-nodes of the current node constitute a plane in the second spatial direction, and the third planar flag information indicates that the occupied child-nodes of the current node constitute a plane in the third spatial direction, determining second plane position information of the current node in the second spatial direction and third plane position information of the current node in the third spatial direction; and determining the reconstructed geometry information of the current node based on the second plane position information and the third plane position information.

7. The method according to claim 1, wherein the method further comprises:

in a case where the first planar flag information indicates that the occupied child-nodes of the current node do not constitute a plane in the first spatial direction, the second planar flag information indicates that the occupied child-nodes of the current node do not constitute a plane in the second spatial direction, and the third planar flag information indicates that the occupied child-nodes of the current node constitute a plane in the third spatial direction, determining third plane position information of the current node in the third spatial direction; and determining the reconstructed geometry information of the current node based on the third plane position information.

8. The method according to claim 1, wherein the method further comprises:

in a case where the first planar flag information indicates that the occupied child-nodes of the current node do not constitute a plane in the first spatial direction, determining that the first planar flag information indicates that a plane constituted by the occupied child-nodes of the current node is perpendicular to the first spatial direction;

in a case where the second planar flag information indicates that the occupied child-nodes of the current node do not constitute a plane in the second spatial direction, determining that the second planar flag information indicates that a plane constituted by the occupied child-nodes of the current node is perpendicular to the second spatial direction;

in a case where the third planar flag information indicates that the occupied child-nodes of the current node do not constitute a plane in the third spatial direction, determining that the third planar flag information indicates that a plane constituted by the occupied child-nodes of the current node is perpendicular to the third spatial direction.

9. The method according to claim 1, wherein the method further comprises:

in a case where the current node meets a plane qualification determination condition in all of the three preset spatial directions, performing a process for determining the all planar flag information.

10. The method according to claim 9, wherein the method further comprises:

in a case where the current node does not meet the plane qualification determination condition in all of the three preset spatial directions, for one or two spatial directions that meet the plane qualification determination condition, decoding the bitstream to determine planar flag information of the current node in the one or two spatial directions; and determining the reconstructed geometry information of the current node according to the planar flag information of the current node in the one or two spatial directions.

11. The method according to claim 1, wherein the method further comprises:

in a case where a value of a plane position information is a first value, determining that the plane position information indicates that the occupied child-nodes of the current node constitute a high plane in a corresponding spatial direction; and in a case where a value of the plane position information is a second value, determining that the plane position information indicates that the occupied child-nodes of the current node constitute a low plane in a corresponding spatial direction.

12. A point cloud encoding method, applied to an encoder and comprising:

determining three pieces of planar flag information of a current node in three preset spatial directions;

in a case where the three pieces of planar flag information indicate that occupied child-nodes of the current node constitute planes in all of the three preset spatial directions, setting all planar flag information of the current node to indicate that the occupied child-nodes of the current node constitute planes in all of the three preset spatial directions, and writing the all planar flag information into a bitstream; and in a case where the three pieces of planar flag information indicate that occupied child-nodes of the current node do not all constitute planes in the three preset spatial directions, setting all planar flag information of the current node to indicate that the occupied child-nodes of the current node do not all constitute planes in the three preset spatial directions, and writing the all planar flag information into a bitstream;

wherein the method further comprises:

in a case where first planar flag information indicates that the occupied child-nodes of the current node do not constitute a plane in a first spatial direction, and/or second planar flag information indicates that the occupied child-nodes of the current node do not constitute a plane in a second spatial direction, determining third planar flag information of the current node in a third spatial direction;

wherein the method further comprises:

in a case where the first planar flag information indicates that the occupied child-nodes of the current node constitute a plane in the first spatial direction, the second planar flag information indicates that the occupied child-nodes of the current node do not constitute a plane in the second spatial direction, and the third planar flag information indicates that the occupied child-nodes of the current node do not constitute a plane in the third spatial direction, determining first plane position information of the current node in the first spatial direction; and writing the first plane position information into the bitstream after the first planar flag information is written into the bitstream; and in a case where the first planar flag information indicates that the occupied child-nodes of the current node constitute a plane in the first spatial direction, the second planar flag information indicates that the occupied child-nodes of the current node do not constitute a plane in the second spatial direction, and the third planar flag information indicates that the occupied child-nodes of the current node constitute a plane in the third spatial direction, determining first plane position information of the current node in the first spatial direction and third plane position information of the current node in the third spatial direction; and writing the first plane position information into the bitstream after the first planar flag information is written into the bitstream, and writing the third plane position information into the bitstream after the third planar flag information is written into the bitstream.

13. The method according to claim 12, wherein the method further comprises:

in a case where the all planar flag information indicates that the occupied child-nodes of the current node constitute planes in all of the three preset spatial directions, determining three pieces of plane position information of the current node in the three preset spatial directions, and writing the three pieces of plane position information into the bitstream; and in a case where the all planar flag information indicates that the occupied child-nodes of the current node do not all constitute planes in the three preset spatial directions, performing encoding processing according to first planar flag information of the current node in a first spatial direction and second planar flag information of the current node in a second spatial direction.

14. The method according to claim 13, wherein the method further comprises:

in a case where the all planar flag information indicates that the occupied child-nodes of the current node constitute planes in all of the three preset spatial directions, not writing the three pieces of planar flag information of the current node in the three preset spatial directions into the bitstream.

15. The method according to claim 13, wherein the method further comprises:

in a case where the first planar flag information indicates that the occupied child-nodes of the current node constitute a plane in the first spatial direction, and the second planar flag information indicates that the occupied child-nodes of the current node constitute a plane in the second spatial direction, determining first plane position information of the current node in the first spatial direction and second plane position information of the current node in the second spatial direction; and writing the first plane position information into the bitstream after the first planar flag information is written into the bitstream; and writing the second plane position information into the bitstream after the second planar flag information is written into the bitstream.

16. A non-transitory computer storage medium, having stored a bitstream generated according to the point cloud encoding method according to claim 12.

17. A decoder, wherein the decoder comprises: a first processor and a first memory storing instructions executable by the first processor, and the instructions, when being executed by the first processor, cause the decoder to perform:

decoding a bitstream, and determining all planar flag information of a current node;

in a case where the all planar flag information indicates that occupied child-nodes of the current node constitute planes in all of three preset spatial directions, decoding the bitstream to determine three pieces of plane position information of the current node in the three preset spatial directions, and determining reconstructed geometry information of the current node based on the three pieces of plane position information; and in a case where the all planar flag information indicates that occupied child-nodes of the current node do not all constitute planes in three preset spatial directions, decoding the bitstream to determine first planar flag information of the current node in a first spatial direction and second planar flag information of the current node in a second spatial direction, and determining reconstructed geometry information of the current node according to the first planar flag information and the second planar flag information;

wherein the decoder further performs:

in a case where the first planar flag information indicates that the occupied child-nodes of the current node do not constitute a plane in the first spatial direction, and/or the second planar flag information indicates that the occupied child-nodes of the current node do not constitute a plane in the second spatial direction, decoding the bitstream to determine third planar flag information of the current node in a third spatial direction; wherein the third spatial direction is a direction of the three preset spatial directions other than the first spatial direction and the second spatial direction;

wherein the decoder further performs:

in a case where the first planar flag information indicates that the occupied child-nodes of the current node constitute a plane in the first spatial direction, the second planar flag information indicates that the occupied child-nodes of the current node do not constitute a plane in the second spatial direction, and the third planar flag information indicates that the occupied child-nodes of the current node do not constitute a plane in the third spatial direction, determining first plane position information of the current node in the first spatial direction; and determining the reconstructed geometry information of the current node based on the first plane position information; and in a case where the first planar flag information indicates that the occupied child-nodes of the current node constitute a plane in the first spatial direction, the second planar flag information indicates that the occupied child-nodes of the current node do not constitute a plane in the second spatial direction, and the third planar flag information indicates that the occupied child-nodes of the current node constitute a plane in the third spatial direction, determining first plane position information of the current node in the first spatial direction and third plane position information of the current node in the third spatial direction; and determining the reconstructed geometry information of the current node based on the first plane position information and the third plane position information.

18. The decoder according to claim 17, wherein the decoder further performs:

in a case where the all planar flag information indicates that the occupied child-nodes of the current node constitute planes in all of the three preset spatial directions, setting three pieces of planar flag information of the current node in the three preset spatial directions to indicate respectively that the occupied child-nodes of the current node constitute planes in the three preset spatial directions.

19. The decoder according to claim 17, wherein the decoder further performs:

in a case where the first planar flag information indicates that the occupied child-nodes of the current node constitute a plane in the first spatial direction, and the second planar flag information indicates that the occupied child-nodes of the current node constitute a plane in the second spatial direction, decoding the bitstream to determine first plane position information of the current node in the first spatial direction and second plane position information of the current node in the second spatial direction; and determining the reconstructed geometry information of the current node based on the first plane position information and the second plane position information.

20. The decoder according to claim 17, wherein the decoder further performs:

in a case where the first planar flag information indicates that the occupied child-nodes of the current node constitute a plane in the first spatial direction, and the second planar flag information indicates that the occupied child-nodes of the current node constitute a plane in the second spatial direction, setting third planar flag information of the current node in a third spatial direction to indicate that the occupied child-nodes of the current node do not constitute a plane in the third spatial direction.

* * * * *